United States Patent
Troxel (12)

(10) Patent No.: US 6,185,210 B1
(45) Date of Patent: Feb. 6, 2001

(54) VIRTUAL CIRCUIT MANAGEMENT FOR MULTI-POINT DELIVERY IN A NETWORK SYSTEM

(75) Inventor: Gregory D. Troxel, Stow, MA (US)

(73) Assignee: BBN Corporation, Cambridge, MA (US)

(*) Notice: Under 35 U.S.C. 154(b), the term of this patent shall be extended for 0 days.

(21) Appl. No.: 08/940,666

(22) Filed: Sep. 30, 1997

(51) Int. Cl.[7] .................................................. H04L 12/28
(52) U.S. Cl. ......................................... 370/395; 370/397
(58) Field of Search ................................ 370/395, 397, 370/396, 399, 400, 408, 409, 410, 260, 261

(56) References Cited

U.S. PATENT DOCUMENTS

| | | | |
|---|---|---|---|
| 5,014,265 | * 5/1991 | Hahne | 370/397 |
| 5,163,046 | * 11/1992 | Hahne | 370/409 |
| 5,446,730 | * 8/1995 | Lee | 370/351 |
| 5,511,168 | 4/1996 | Perlman et al. | 395/200 |
| 5,519,704 | 5/1996 | Farnacci et al. | 370/85.13 |
| 5,530,703 | 6/1996 | Liu et al. | 370/85.13 |
| 5,583,862 | * 12/1996 | Callon | 370/397 |
| 5,706,279 | * 1/1998 | Teraslinna | 370/397 |
| 5,724,513 | * 3/1998 | Ben-Nun | 395/200.64 |
| 5,781,529 | * 7/1998 | Liang | 370/397 |
| 5,822,304 | * 10/1998 | Brody | 370/399 |
| 5,854,899 | * 12/1998 | Callon | 395/200.68 |
| 5,867,653 | * 2/1999 | Aras | 370/260 |

FOREIGN PATENT DOCUMENTS

PCT/US95/
13838  5/1996 (WO).

* cited by examiner

Primary Examiner—Douglas W. Olms
Assistant Examiner—Ricardo M. Pizarro
(74) Attorney, Agent, or Firm—Leonard Charles Suchyta; James K. Weixel

(57) ABSTRACT

A system and method for optimizing and managing Qos (Quality of Service) in a network system including a plurality of open point-to-multipoint virtual circuits (VC)s between various endpoint sites, for example in multicast systems. VC optimization includes determining more appropriate set of VC endpoints to reduce oversent data. If below the VC limit, a set of potential VCs is determined, the set excluding combinations with VC connections already open. An estimation or calculation is performed to determined a reduction in oversent data that would occur if that a possible VC was opened. The possible VC with the greatest reduction in oversent data is then opened. Appropriate traffic is moved over to the newly opened VC, and any VCs which no longer have any traffic are closed. If a VC limit is reached for a node, a different optimization technique is used. A set of possible VCs to endpoint sites is determined. From this set, a new VC to open is selected which, if opened, would cause the greatest reduction in oversent data. From the presently opened VCs, an open VC is selected which, if closed, would cause the least increase in oversent data. The new VC is opened, and appropriate traffic and flows are moved to it. The open (old) VC is then closed. These optimization techniques are alternated with other optimization techniques.

20 Claims, 11 Drawing Sheets

VIRTUAL CIRCUIT MANAGEMENT FOR MULTI-POINT DELIVERY IN A NETWORK SYSTEM

STATEMENT REGARDING FEDERALLY-SPONSORED RESEARCH

The U.S. Government has a paid up non-exclusive, non-transferable license to practice or have practiced for or on behalf of the United States this invention as provided for by the terms of contract No. N66001-96-D8608, awarded by DARPA.

BACKGROUND

A computer network typically comprises a collection of interconnection nodes such as computer systems and switches. These may in turn be connected through an irregular configuration of transmission lines, i.e., links. The switches are specialized computers used to connect two or more links. Data is exchanged among nodes of such an arbitrary topology network by passing packets and messages from switch to switch over the links. Specifically, when a packet or message arrives on an incoming link, the switch decides onto which of the outgoing links that packet will be forwarded.

In a connection-oriented network, a virtual circuit (VC) is commonly established when exchanging packets between nodes of the network. The virtual circuit is a temporary logical path connection that requires a set up procedure to open the virtual circuit prior to transferring the data packets, and a release procedure to close the circuit once the data transfer is complete. This obviates the need for effecting routing decisions for each data packet that is transferred between the nodes once the circuit is opened. For point-to-point communication, the set up procedure creates a virtual circuit by allocating certain switches and links in the network to establish the "best" route, according to conventional route configuration techniques, between a source node and a destination node. However, opening and closing virtual circuits is a time and resource consuming task. Further, there are limits as to how many virtual circuits can be opened and supported simultaneously.

Virtual circuits can also perform point-to-multipoint connections, where one source node connects to several destination nodes. This allows several techniques, including multicasting, which involves transmitting a single multicast packet from a source node and having it received by a group of destination nodes.

One use for multicasting is Distributed Interactive Simulation (DIS) applications. An example of DIS is military training, although DIS technology can be used for training non-military personnel and to construct distributed virtual-reality games. A simulation involving a multitude of actors or objects is set up and maintained in near-real time. Typical objects are tanks, trucks, planes, helicopters, ships, and dismounted infantry (soldiers). In a simulation, a computer is responsible for modeling some number (typically between 1 and 100) entities. Each machine sends packets containing the current state of locally modeled entities, and receives packets containing the current state of remote entities within the region of interest of local entities.

DIS can benefit from IP multicasting in that simulation packets are delivered to only those simulators that need them. Typically, each entity transmits to one multicast group and joins a number of multicast groups. One can imagine a grid in latitude and longitude and sending to a group corresponding to one's location and joining all nearby groups.

One technique for providing multicast is called bilevel multicast. The central idea of bilevel multicast is the construction of a private virtual multicast network using an existing multipoint delivery service. All bilevel multicast routers (BMRS) are peers connected to the multipoint delivery service. More features of bilevel multicast will be discussed below.

There is a need to use more and more multicast groups for DIS and other applications to obtain finer-grained control over data delivery and deliver less unneeded data. There are also constraints which prevent the use of as many multicast groups as are desired. Routers cannot support a very large number of groups. Multicast routing protocols that can handle a very large number of concurrent multicast groups have not yet been developed. Some problems that must be addressed include routing traffic caused by transient joining of groups, the requirement of sufficient router memory to hold multicast routing tables.

Another constraint is the inability of hosts to support a large number of subscribed multicast groups efficiently. There are two common problems: a shortage of hardware filtering slots, so that the network interface delivers all multicast packets to the operating system; and the lack of efficiency of networking code to deal with one hundred or more subscribed groups. Accordingly, efficient delivery of packets to the proper destinations with a minimum of oversent data is very important. Oversent data is data sent to more destinations than it is needed. Further, the efficient use of bandwidth to deliver as many packets as possible, while observing packet requirements including priority levels. Obtaining a proper balance of high packet throughput while guaranteeing high-priority packets are not delayed (often referred to as Quality of Service (QoS)) is extremely problematic.

Accordingly, what is needed is a system and method for optimizing a network's virtual circuits (VCs), including minimizing oversent data, and utilizing VC bandwidth for optimum delivery while still maintaining quality of service. Further, the optimizations should perform well with the transient nature of nodes joining and leaving multicast groups, and VCs opening and closing in response to the multicast membership changes.

SUMMARY

The present invention is directed towards a system and method for optimizing flow control through a node in a network system, where messages forwarded to the node have one of at least two priorities, a normal priority and a high priority. It includes a token counter associated with a flow into the node, the token counter holding a numeric value representing a number of tokens. The token counter is incremented at a predetermined rate of tokens per second, and has a maximum value.

The token counter is decremented by a number of tokens as required for passing an arriving message in that flow through the node. The number of tokens required for passing the arriving message is determined by attributes of the arriving message, for example one token for each byte of message size.

A normal priority threshold value is associated with the token counter. If a message with a high priority arrives at the node, the message is marked non-conforming if the token counter is below the number of tokens required for passing said message. If a message with a normal priority arrives at node, the message is marked non-conforming if the token counter is below the number of tokens required for passing said message plus the normal priority threshold value.

Messages marked non-conforming in the first stage may be dropped, or passed on the more policing processing, or sent out of the node with appropriate standard tagging for network messages over a flow.

The system and method also includes a second stage, which includes an aggregate token counter, for holding a numeric value representing a number of tokens, the aggregate token counter is incremented at a predetermined rate of tokens per second, and is decremented by a number of tokens as required for passing the arriving message through the node, the number of tokens required for passing said arriving message is determined by attributes of the arriving message. This aggregate token counter also includes a maximum limit value.

An aggregate normal priority threshold value is associated with the aggregate token counter. If a message with a high priority was not marked non-conforming in the first stage, the message is marked non-conforming in the second stage if the aggregate token counter is below the number of tokens required for passing the message. If a message with a low priority was not marked non-conforming in the first stage, the message is marked non-conforming in the second stage if the aggregate token counter is below the number of tokens required for passing said message plus the normal priority threshold value.

Messages marked non-conforming in said second stage may be dropped or sent out appropriately tagged for the network flow.

The system and method also includes an aggregate headroom threshold value associated with the aggregate token counter, the aggregate headroom threshold value being greater than the aggregate normal priority threshold value. If a message was marked non-conforming in the first stage (or was marked non-conforming by a previous node or router), the message is marked conforming if the aggregate token counter is at or above the number of tokens required for passing the message plus the aggregate headroom threshold value.

In one embodiment, the number of tokens required for passing a message is related to the cost of sending said message out over a particular network. Types of networks include an IP network, where messages marked as non-conforming are sent out as routine status, and messages marked as conforming are sent out as elevated status; and an ATM network, and messages marked as non-conforming are sent out as CLP-1, and messages marked as conforming are sent out as CLP-0.

The present invention also is directed towards optimizing and managing Qos (Quality of Service) among VCs for point-to-multipoint connections. In a network system including a plurality of open point-to-multipoint virtual circuits (VC)s between various endpoint sites, a method of optimizing traffic flow is presented.

A set of possible VCs is determined, the set excluding combinations with VC connections already open. For each possible VC in the set, an estimation or calculation is performed to determined a reduction in oversent data that would occur if that possible VC was opened. The possible VC with the greatest reduction in oversent data is then opened. Appropriate traffic is moved over to the newly opened VC, and any VCs which no longer have any traffic are closed.

Other methods of optimizing traffic flow including resizing the Qos (quality of service) requirement of an existing open VC, or opening a similar VC (with the same endpoint set), with the new Qos requirements, and moving appropriate flows over to the new VC, and closing down the old VC.

If a (real or predetermined) VC limit is reached for a node, the present invention includes a method for optimization. A set of possible VCs to endpoint sites is determined. From this set, a new VC to open is selected which, in the preferred embodiment, if opened, would cause the greatest reduction in oversent data. From the presently opened VCs, an open VC is selected which, in the preferred embodiment, if closed, would cause the least increase in oversent data.

If the new VC is different from the open VC, then new VC is opened, and appropriate traffic and flows are moved to it. The open (old) VC is then closed.

If the selected possible VC can not be opened, an identification of that possible VC is placed on a list of VCs which could not be opened. When determining the set of possible VCs to the endpoint sites, VCs identified by the list of VCs which could not opened will be excluded. This list is periodically cleared of all entries.

DETAILED DESCRIPTION

Figure 1:
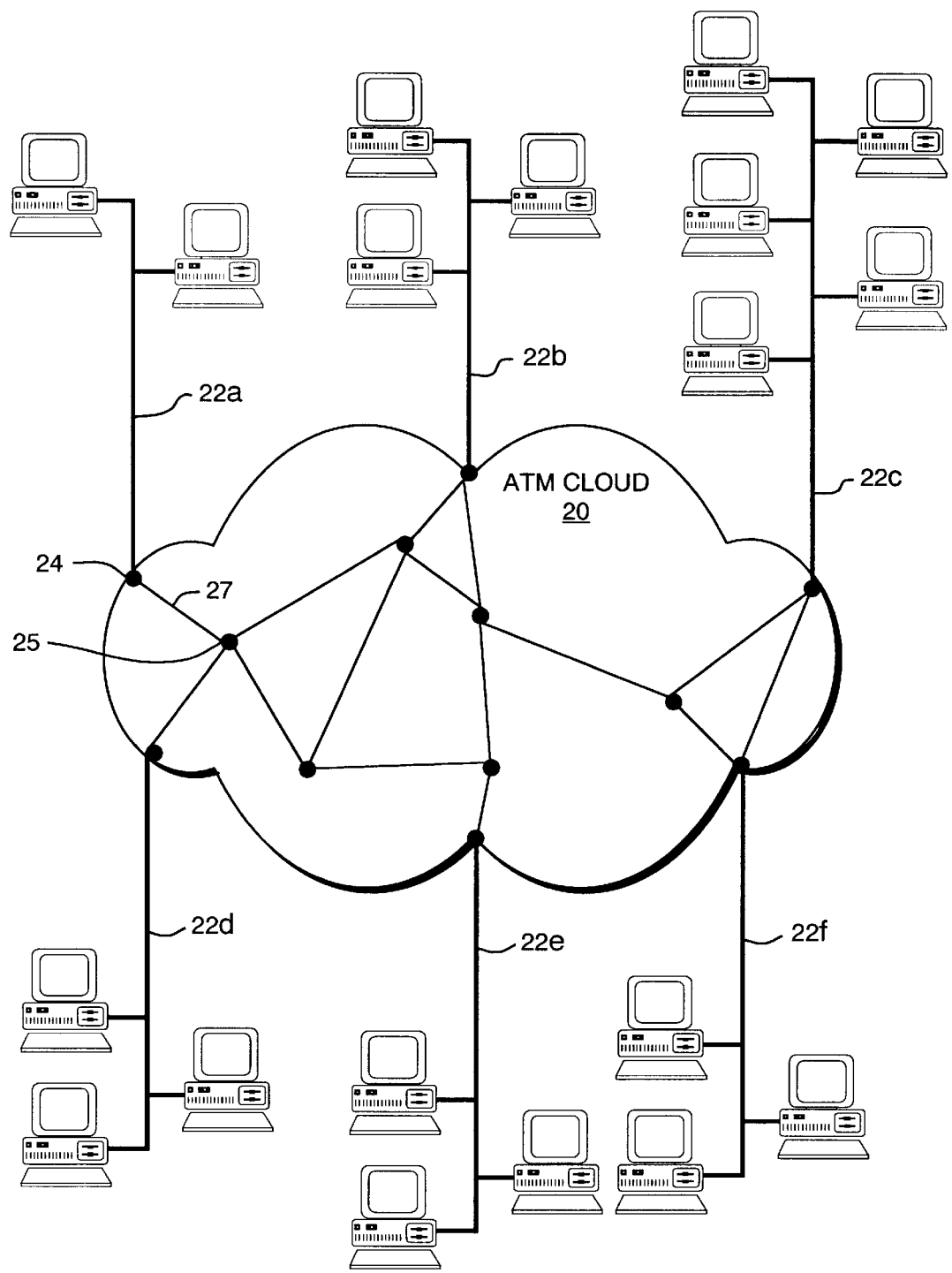
FIG. 1 is an pictorial overview of a network system.

An example ATM (Asynchronous Transfer Mode) network 20 is shown in FIG. 1. The "ATM Cloud" is a set of nodes (for example node 24 and 25) which have established paths 27 between other networks 22. The networks 22 can be of any type including LAN and WAN, or backbones to other systems.

Figure 2:
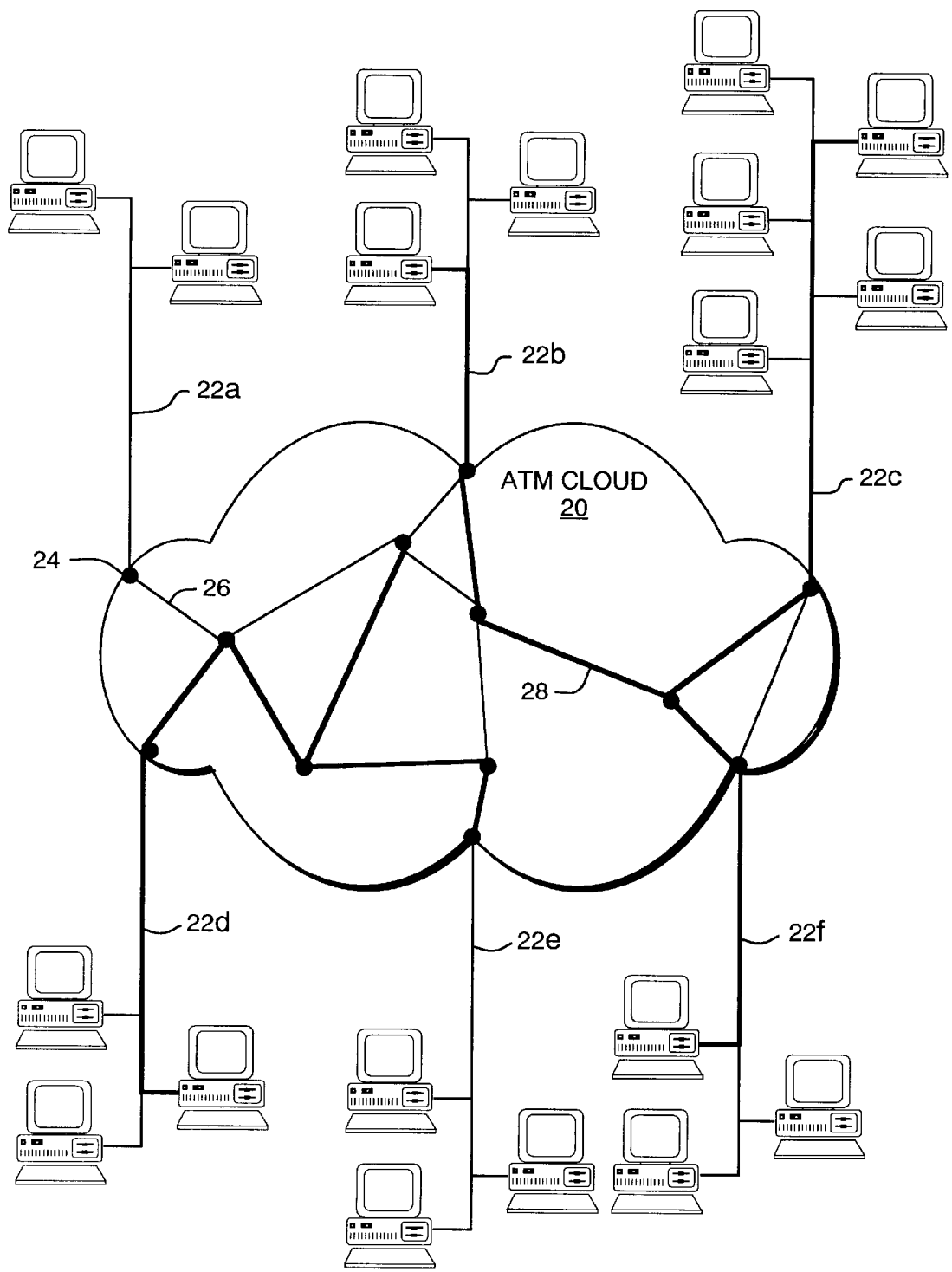
FIG. 2 is the pictorial overview of the network system of FIG. 1, with some example point to multipoint Virtual Circuits (VC) created between nodes.

In an ATM system, virtual circuits (VCs) are established in point-to-point or point-to-multipoint arrangements using the paths 27 and nodes 25. For example, as shown in FIG. 2, VC 26 is established from network 22a to network 22d and 22e. Also, a second VC 28 is established from network 22b to network 22c and 22f.

Ideally, networks 22a, 22d and 22e as connected by VC 26 are one multicast group, and data and packets sent to those networks will only reach the nodes as necessary for that multicast group. However, data and copies of data must often be sent to more nodes than necessary to guarantee delivery to the appropriate group of destinations. With a VC created for each multicast group, there is exponential growth as more multicast groups are created and modified.

Figure 3:
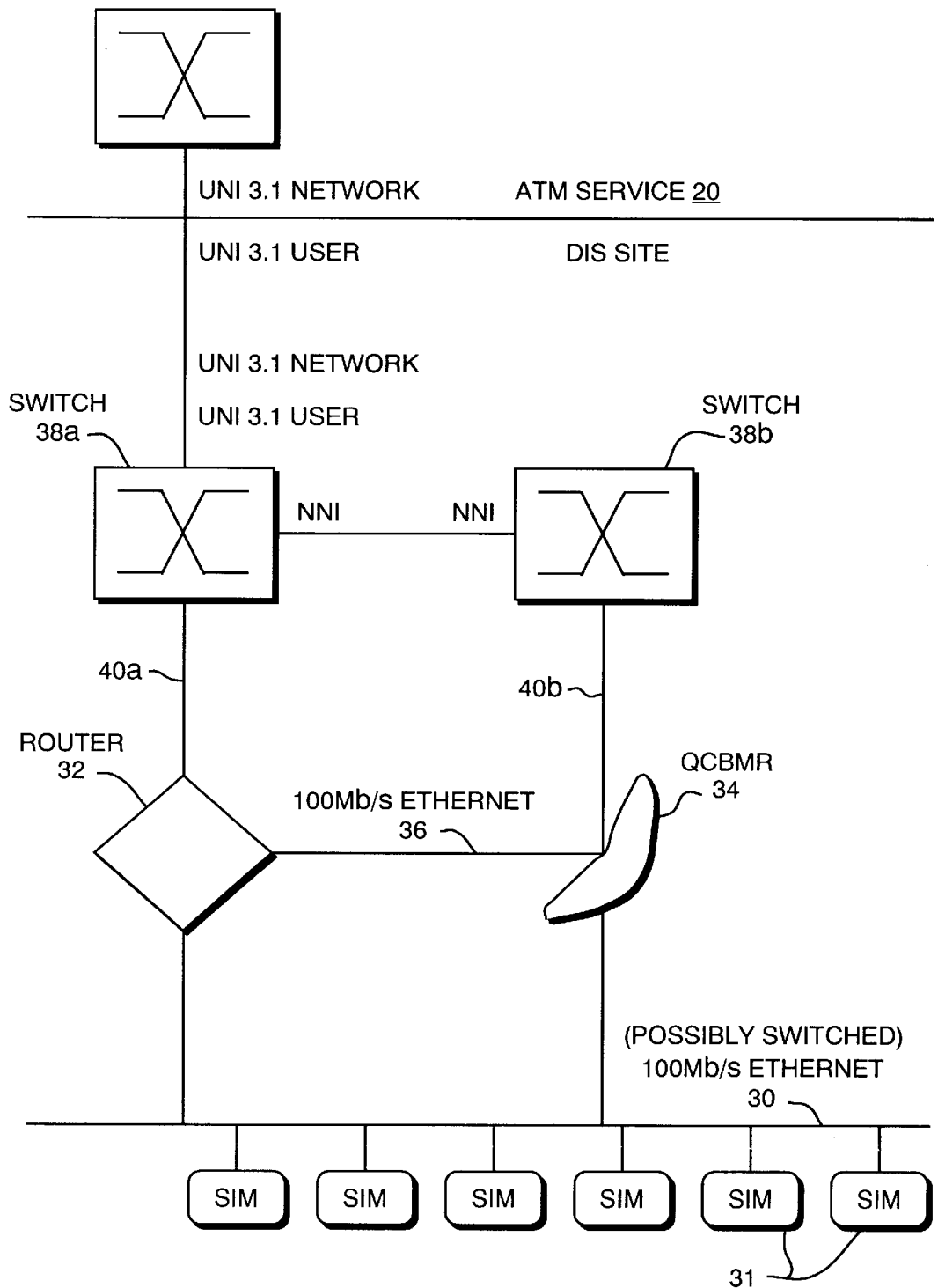
FIG. 3 shows an example Distributed Interactive Simulation (DIS) site.

FIG. 3 shows the elements of an example DIS site. The simulators are shown connected to an ethernet 30. To this Ethernet 30 are connected a router 32 and a qcbmr 34, which are interconnected via a 100 Mb/s Ethernet 36. The router 32 is any commercial router configured to forward only IP unicast traffic. The qcbmr 34 is used for forwarding IP multicast traffic. The two NNI switches 38 are used to concentrate traffic coming (over a network 40 for example, a UNI 3.1 network) from the router 32 and the qcbmr 34 to the ATM network 20. Alternatively, a single switch 38 could be used having both the router 32 and the qcbmr 34 connected to it.

The qcbmr 34 is currently implemented using an Intel Pentium® or Pentium Pro® PC, including a 100 mbit/second ethernet card, and an OC-3C 155 mbit/second interconnection (for example Efficient Networks interconnection) and running NetBSD.

Figure 4:
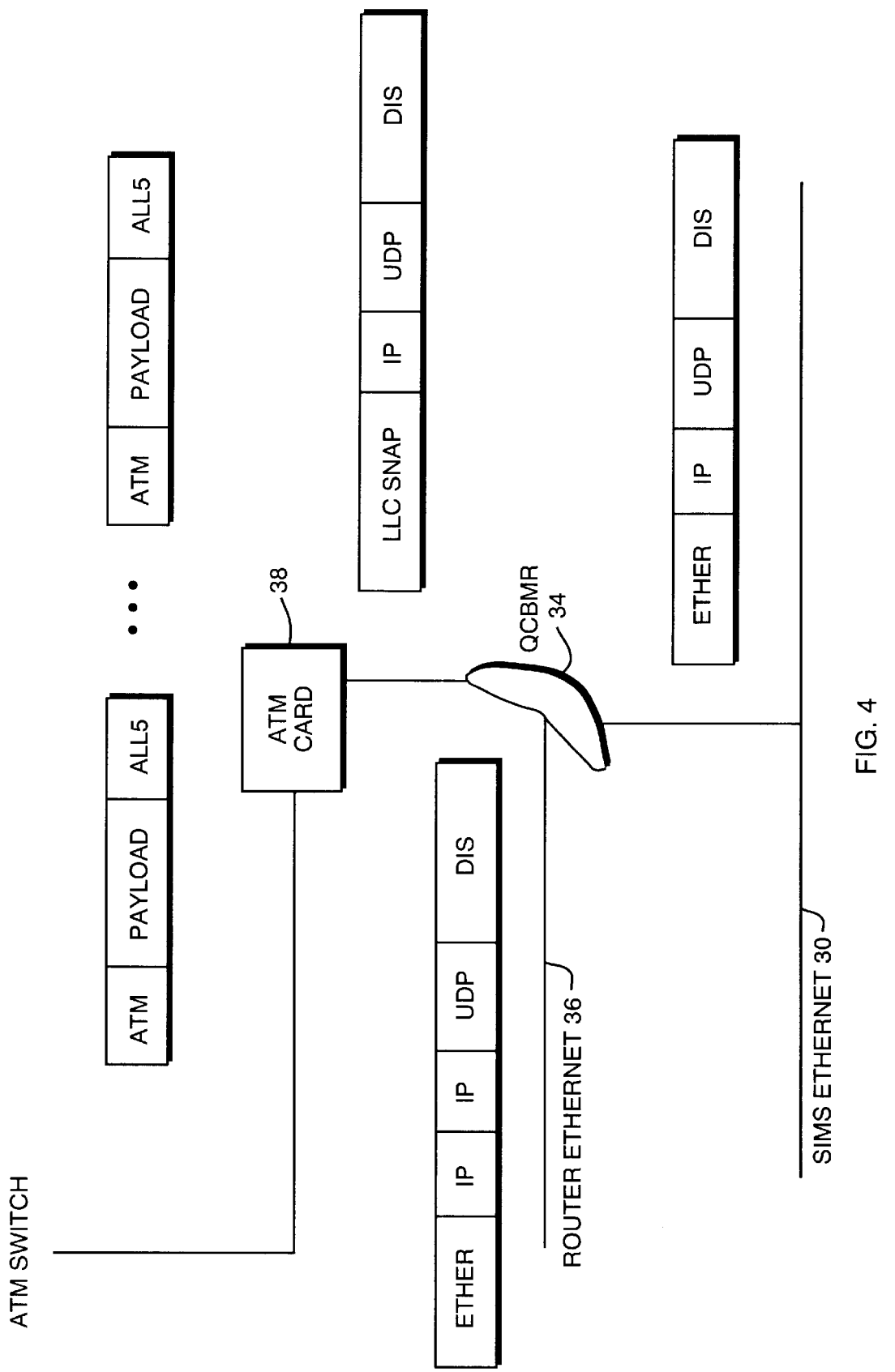
FIG. 4 shows how data is encapsulated at different interfaces to the Qos-Capable Bilevel Multicast Router (qcbmr)

FIG. 4 shows how DIS data is encapsulated at the different interfaces to the qcbmr 34. At the interface to the Simulators (31 FIG. 3), the encapsulating protocols are Ethernet, IP, and UDP. At the interface to the Router, the encapsulating protocols are Ethernet, IP, IP, and UDP (including double IP encapsulation). At the interface to the ATM card (switch 38), in the qcbmr, the encapsulating headers are LLC-SNAP, IP, and UDP. At the interface to the FASTLANE, the previous frame has been split into cells and AAL5 information has been added to each cell.

In terms of bilevel multicast a private virtual multicast network using an existing multipoint delivery service is constructed. All bilevel multicast routers (BMRs) are peers connected to the multipoint delivery service.

There should exist some set of named multipoint delivery objects. These could be IP multicast groups, simply named by the multicast IP destination address. These could also be ATM virtual circuits (VCs), ST2 streams, or any other mechanism which allows one BMR to convey data to a set of other BMRs. A feature is that the multipoint mechanism need not be reliable.

For each BMR, there should be a multipoint delivery object with at least all other BMRs as recipients. In the IP case, this requirement can be satisfied with an "all-BMR" multicast group, and in the ATM case, it can be satisfied by having each BMR open an SVC (or have an open PVC) with all other BMRs as leaves.

The simplest case is IP/IP 2N bilevel, where the underlying service is IP multicast, and approximately $2^n$ multicast groups are used for n BMRs —one group for each member of the power set of BMRs. The BMR with index i (from 0 to n−1) is a member of the jth group if bit i is set in j. If there are 10 BMRs, and the underlying service multicast groups are 230.0.0.0 through 230.0.3.255, then BMRs 0, 1, 4, and 9 would each join group 230.0.2.19. Note that each BMR joins approximately half of the underlying service multicast groups. This scheme does not work well if n is large, and we later discuss mechanisms for when n is so large that using $2^n$ multipoint delivery objects is problematic, as well as a scheme for ATM.

To implement this virtual multicast network, each bilevel multicast router (BMR):
- determines local membership in constructed multicast service (CMS) groups (using IGMP, exactly as a conventional multicast router would).
- distributes the list of local memberships to all other BMRs so that each knows which CMS groups are needed by which BMR.
- knowing the membership of BMRs in underlying multicast service (UMS) groups and which CMS groups are needed by each BMR, computes the UMS group to be used for each CMS group so that packets addressed to the CMS group are delivered to at least the BMRs with local members of that groups.
- on receipt of an CMS packet from the local attached network, decrements the TTL, and forwards it via the appropriate UMS group. For the IP/IP case, this means encapsulating it in IP, with the outer header having the correct UMS group as destination. For ATM, it means sending it on the appropriate VC.
- on receipt of a (possibly encapsulated) CMS packets from the UMS, decrements the TTL and delivers it to the attached network if there are local members.

A central point of bilevel multicast is that it can construct a service with properties needed by users from a service that has properties that are reasonable from a network point of view. This implementation of multicast routing at the edges of a network can isolate the network providers from the group joining and leaving behavior of the users. An example of this is when a user community wants to use 10000 or more multicast groups, and the backbone provider does not wish to provide multicast routing with adequate table space for that many groups, or when the provider does not want the routers to handle the requisite multicast routing traffic.

IP/IP Bilevel multicast can function well with a modest underlying multicast service (UMS):
- moderate number of groups ($2^N$ for N sites, or even fewer as described below)
- very large join times in UMS are acceptable Bilevel multicast provides a very capable multicast service as the constructed multicast service (CMS):
- large number of groups (64K, for example) (independent of the number of supported UMS groups)
- low join times (on the order of a one-way trip time (OTT))

In bilevel multicast all of the control traffic of the CMS is data to the UMS. That is, all of the communications between bilevel routers about which CMS groups are needed where are data to the routers and switches of the UMS, rather than being routing traffic which must be processed. This is advantageous for three reasons. First, the routers (or switches) of the UMS do not participate in the bilevel routing protocol, and therefore do not have to allocate resources for this function. Second, it means that the BMR-BMR routing information transfer latency is the one-way trip time across the UMS, plus any processing delays at the two BMRs. There are no processing delays at the intermediate routers of the UMS, since they are merely forwarding data. Third, one can run a bilevel multicast implementation on a given multicast service without needing permission from the UMS operator, since bilevel appears to the UMS as a multicast user.

All bilevel routers are direct peers of each other. Bilevel routers communicate with each other directly using the underlying multicast service, and that they do not send constructed service datagrams received from another bilevel router to a third bilevel router. Thus, no bilevel router acts as an intermediate hop.

There are two classes of multicast routing protocols, join-driven and data-driven. The earliest, referred to as dense-mode, or data-driven, forward data via a flooding mechanism until they receive prune messages from parts of the distribution tree that do not need data for that group. PIM-dense and DVMRP fall into this category. With a data-driven protocol, routing state is propagated by the transmission of data packets. In general, no routing state is propagated by a join (unless "prune" state already exists).

The other broad class of routing protocol is referred to as sparse-mode or join-driven. In this type of protocol, sending data does not propagate routing state. Joining a group causes routing state to be set up. Then, data is forwarded using the previously created state. CBT and PIM-sparse are examples of join-driven protocols.

When a CMS data packet arrives, it is forward according to existing routing state, and no routing protocol operations are triggered by this arrival. When a bilevel router detects that a new group has one or more members, it sends a message (via the Bilevel Multicast Routing Protocol (BMRP)) to its peers, which then update their routing tables. Therefore, Bilevel multicast is a join-driven protocol.

There are practical limits on the number of CMS groups. One is the amount of memory required to hold table entries. Each BMR must hold an entry for a group for which any BMR has a local member. In addition, there are limits imposed by the rate at which routing messages can be sent.

Bilevel multicast is a special case of multilevel multicast, in which a bilevel implementation uses as its UMS a multicast service which may be the CMS of a separate bilevel implementation. The fundamental concept of the bilevel approach is the construction of a multicast service with substantially more useful properties than those of the underlying service—the construction of a user-centric service from a network-centric service.

Bilevel multicast is a mechanism to aggregate group state to control the amount of routing state needed in the core routers. In this regard it is like the use of hierarchical postal addresses, or the use of aggregable prefixes in unicast routing. However, the aggregated labels are multicast rather than unicast, and they are not derived from the original (constructed service) addresses themselves, but from routing state maintained by the bilevel scheme.

The role of a routing protocol used for bilevel multicast is to transmit the list of multicast groups for which there are local members from each bilevel router to all other bilevel routers. Because bilevel multicast is intended for situations where there are many groups and a high frequency of joins and leaves, the protocol must be efficient under those circumstances. The protocol must be robust in that it must operate correctly as bilevel routers appear, restart, and disappear.

With regard to bilevel multicast when the UMS is IP multicast, special situations are presented. The possible number of connections between routers can be determined and optimized. Let N be the number of bilevel multicast routers (BMRs). Given a set of N names of bilevel routers S, one would like to have one multicast group for every member of the set of subsets of S: $\{s|s \subset S\}$. This is the power set of S, and there are $2^N$ members. However, it is clearly unnecessary to use a multicast group for the empty set containing no members of S. So, the number of multicast groups needed is $2^{N-1}$.

A further reduction is achieved if one is willing to send some traffic via the unicast routing of the UMS rather than multicast. In this case, UMS groups that contain only one BMR can be eliminated. There are N such groups, one containing each BMR. So, the number of multicast groups need in this case is $2^N-N-1$. For N=7, this is 120; it is not appreciably different from $2^N$. One might wish to send traffic to single-BMR multicast groups rather than sending the traffic unicast if unicast and multicast routing are substantially different.

Upon receiving a multicast datagram from the CMS-side interface, a BMR MUST first decrement the TTL of the datagram, and discard it if it is zero. Then, it examines the destination multicast (CMS) address of the packet. From the information exchanged by the routing protocol in use (such as BMRP), it determines the set of remote BMRs that should receive the packet. It then finds the UMS group with that subset of BMRs as members. The packet is encapsulated in an outer IP packet by prefixing an IP header. The source address is the BMR's address on the UMS-side interface. The destination address is the UMS group chosen above. The TTL is set to an administratively configured value sufficient to reach all peer BMRs. The TOS byte is copied from the original IP header, as is the DF bit. The Next Protocol field should be set to "Internet Protocol". The newly constructed packet is then forwarded via the UMS-side interface.

Upon receipt, the packet is deincapsulated. Each BMR joins the appropriate groups on the UMS-side interface. Upon receipt of a packet on one of these groups on the UMS-side interface with Next Protocol field "IP", the BMR strips and discards the outer IP header. Then, it processes the inner IP datagram. First, it MUST decrement the IP TTL and discard the packet if it is zero. Then, it checks whether the CMS destination address is one for which there is a local member. If so, the packet is transmitted via the CMS-side interface. Otherwise, the packet is silently discarded. There are two reasons why a packet addressed to a group with no local members may be received during normal operation. Routing state may have changed recently, and the destination group may no longer be needed locally. Another is that a BMR may have sent a packet via a UMS group that contains more BMRs than the required set; this case is discussed below.

A multicast packet sent by a CMS host will in general see two routers as intermediate hops: the bilevel router serving the network of the host, and the bilevel router serving the network where the packet is delivered. Each of these routers will decrement the TTL. When the encapsulated packet is processed by routers of the UMS, the TTL of the 'outer' IP header is decremented, but the inner IP header, which is now 'data' is not modified. The possibly many hops in the UMS are part of the link between the two bilevel routers. This scheme does not violate the rule that a router must decrement the TTL when forwarding a packet, as a bilevel router does decrement the TTL of an IP packet when it makes a routing decision about that packet.

Since IP is a datagram service and does not guarantee packet ordering, there is no concern with whether a bilevel implementation will cause packets to be reordered.

While only a moderate number of UMS groups are required for a small number of BMRs, the number of UMS groups becomes excessive for 20 or 30 BMRs because the number of UMS groups is exponential in the number of bilevel routers. In this case, bilevel multicast no longer limits the number of UMS groups used. It does, however, still cause the CMS routing information to be data to the UMS.

One way to address this is to use a sparse subset of the $2^N$ groups. A sparse subset R of the set of $2^N$ possible groups S is chosen. Even if the size of R is still exponential with respect to N, a sparse subset is useful if it allows 30 bilevel routers to function with a number of UMS groups that is achievable, such as 1024.

Alternate sparse subsets are possible, and could be chosen based upon observed traffic patterns or further study. With the simple scheme above, having 30 BMRs is reasonable with m=3 or m=4, requiring 1023 or 255 UMS groups, respectively.

A dynamic scheme solution is possible, where the membership of BMRs in UMS groups changes under the control of the routing scheme. One could allocate a certain number of UMS groups to each BMR, and have it send commands to other BMRs to join and leave those groups. Each BMR would then choose a subset of S depending on the current set of destinations.

Bilevel multicast has been implemented and tested. The first prototype BMR implementation was entirely in user space on an SGI workstation, including data forwarding. The UMS was provided by Bay Networks routers connected by a mesh of ATM pt-pt PVCs and using DVMRP, across 6 physical sites in DC area, Austin and San Diego. Seven bilevel routers (two at one site serving separate LANs) supported a 5K entity simulation exercise using about 700 multicast groups, and another simulation with about 1000 groups. Some sites had 2K join events over 30 minutes, or on the order of one join per second. The BMRs used 126 UMS groups.

Bilevel multicast over ATM is fundamentally different than IP-over-IP bilevel multicast because the ATM service model is different from the IP multicast service model. In particular, the underlying multicast services do not have similar characteristics. Because bilevel multicast does not assume any particular details of the IP multicast service model, it is reasonably straightforward to develop IP-over-ATM bilevel multicast. It should be noted that IP over general NBMA bilevel multicast would be similar.

With an ATM UMS, each bilevel router may open a number of point-to-multipoint virtual circuits and request that they terminate at some set of remote bilevel routers. Then, the BMR may send IP packets to any of these VCs. Since bilevel multicast only assumes that each bilevel router has a mechanism to cause IP datagrams to be conveyed to various subsets of other bilevel routers, the mechanism provided by ATM is sufficient.

In using multipoint VCs as the UMS, for the simplest case (where a maximal set of groups in the UMS is to be used), each bilevel router opens $2^{n-1}-1$ VCs, going to the members of the set of subsets of all other routers. Of the VCs created by a bilevel router, almost all of them will be necessarily point-to-multipoint because they have multiple destinations. A small number (n−1) of them could be point-point, as they have one destination.

Most of the VCs which terminate at a bilevel router will be "incoming" and leaves of point-to-multipoint VCs created by other bilevel routers. This can be seen by observing that the average number of leaves of a VC is roughly (n−1)/2. Therefore, if the VC configuration is fully symmetric with respect to each router, there will be (n−1)/2 incoming VCs for each outgoing VC.

These considerations are quite important, because ATM implementations typically place limits on the number of open VCs, and the bilevel scheme does, in the simple case above, reach typical limits of 1–4K with on the order of 10 bilevel routers. However, in ATM point-to-multipoint, packets can be replicated by cell switches in the provider's network; this does not incur extra endpoint link trips or duplication on a given link.

For the case of less than $2^{n-1}$ VCs (ATM LT2N), with a moderate number of bilevel routers, an excessive number of multipoint VCs may be needed to reach each member of the power set of recipients. Therefore a strategy is needed for using fewer VCs than the full power set, and for dynamically choosing the set of open VCs. It is assumed that there are constraints on the number of VCs a particular BMR may have open. These could be a limit on the total number of VCs, the number outgoing VCs, the number of leaves on outgoing VCs, the number of incoming VCs, or other limits. There could also be constraints on the number of total VCs open by all bilevel routers.

Because ATM VCs are controlled by the sender, and because VCs from different senders going to the same destination do not share control resources, individual routers can choose their own VC set. This differs from the IP-over-IP case, where the constraint (when using (S,G)-style multicast protocols) is more likely the total number of active IP multicast groups and having two senders to a one group may not be incrementally more expensive.

In order to evaluate a scheme for a bilevel router to choose which VCs to use, the effects on the other routers must be considered. As an example, assume that each router is constrained to have no more than v VCs open for bilevel routing purposes, and that each slot may be for an incoming or outgoing VC.

The example strategy takes as input the number of VCs available (v) and the number of bilevel routers (N). It then assigns use of the VC slots on each bilevel router: $2v/(N+1)$ for outgoing VCs, and $v/(N+1)$ for incoming VCs for each of the other (N−1) routers. Then, each bilevel router may choose the endpoint set for each of its outgoing VCs, except that it must have no more than $v/(N+1)$ VCs that include a particular peer router as a leaf.

Within this constraint, the router is free to open and close VCs in order to optimize delivery of data, ensuring that data is delivered to all appropriate peer bilevel routers and to as few additional ones as possible.

Given bilevel multicast, the question of resource reservation arises. For example, a classical router has links of some capacity, and it has to choose how to allocate outgoing capacity, typically doing some kind of packet scheduling and policing functions to choose which packets get transmitted and when.

In a bilevel router, however, one of the "output links" is, in the IP-over-IP case, a virtual link or tunnel to some remote set of bilevel routers. A bilevel router could reserve capacity over such a virtual link. A physical link over which the packets are sent may have more capacity than the reserved virtual link capacity. Thus, a router could send more traffic on a virtual link than the capacity of that link. For physical links, this is not possible. Now, the nature of output management has changed from choosing which packet to send on a fixed-rate link when the link becomes free, to choosing which packets to send to a resource-reserved multicast group. If it is assumed that the UMS reservation is in terms of sustained rate and burst size, the output scheduling problem becomes more complex compared to scheduling for fixed-rate lines.

In addition, the problem is more complex because the bilevel router can request reservations of differing sizes over time, rather than making do with the administratively-configured line rate. Thus, the bilevel router must determine what traffic specification (TSPEC) to use when making a UMS reservation. It can do this by examining the reservations made for traffic that it must forward for each of the CMS groups.

Figure 5:
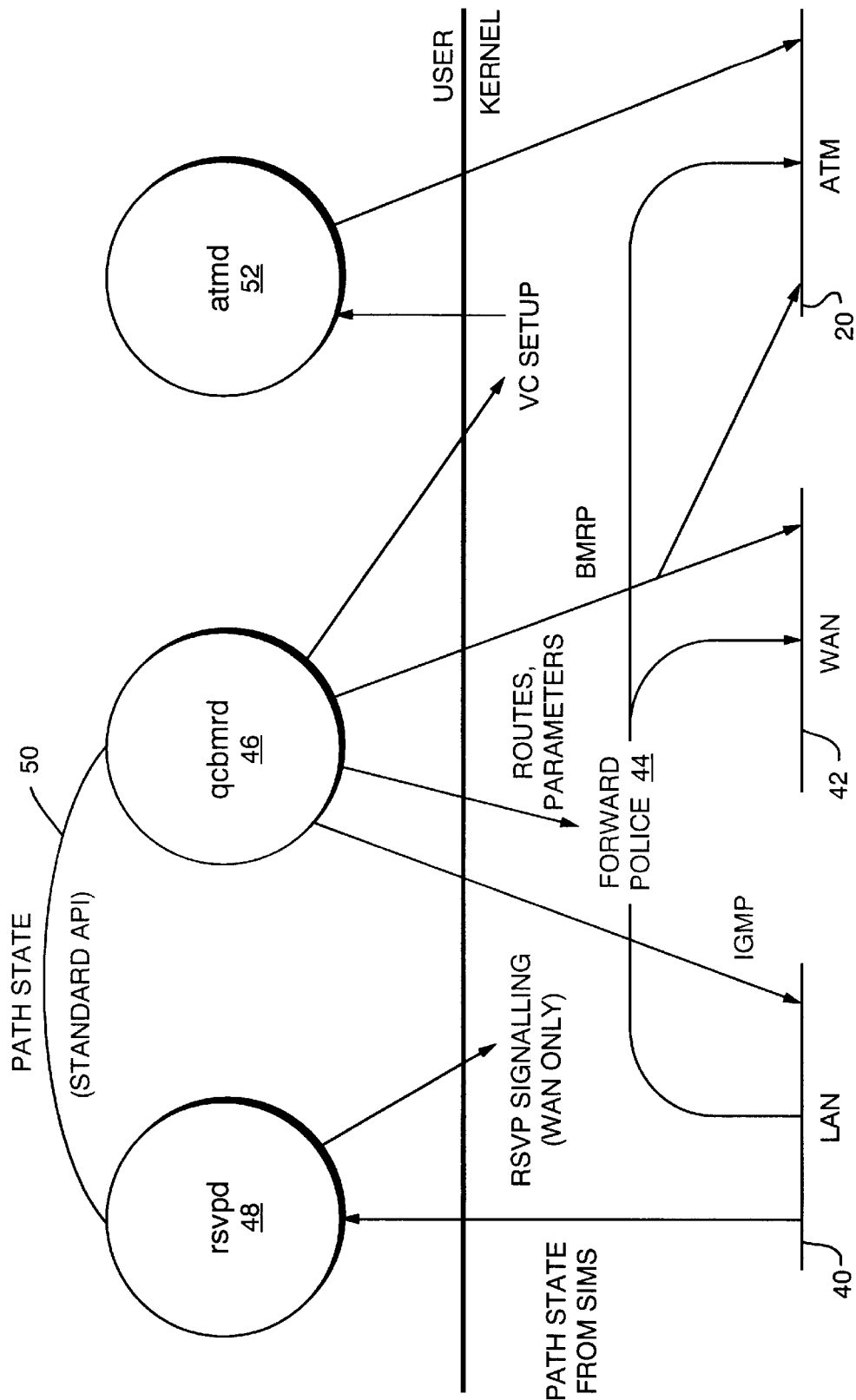
FIG. 5 shows a basic process structure of Qos-Capable Bilevel Multicast Router (qcbmr).

The basic process structure of the qcbmr 34 is shown in FIG. 5. It includes network Interfaces to the LAN 40, WAN 42, and ATM 20 networks. The Forwarding/Policing function 44 is included within the qcbmr kernel that performs the bilevel routing operation, translating LAN multicast groups to WAN multicast groups and vice versa. It also marks or discards packets, as appropriate, to support the QoS operations. The qcbmr Daemon (qcbmrd) 46 is responsible for managing the translation of LAN multicast groups to WAN multicast groups and the associated QoS parameters, and for setting the parameters in the kernel to control routing and policing of traffic. The qcbmrd 46 is also responsible for the exchange of multicast translations with other qcbmrs 40 through the Bilevel Multicast Routing Protocol (BMRP); and for the request for VC 26 setup in the ATM 20 network.

The RSVP Daemon (RSVPd) 48, receives the path state information from the simulators, which in one embodiment it provides to the WAN 42 and to qcbmrd 46 through PATH messages 50. The ATM Daemon (ATMD) 50 participates in the setup and management of ATM VCs.

The forwarding module (both IP/IP and IP/ATM) performs several functions including encapsulation and forwarding of data packets, deincapsulation and delivery of received data packets, monitoring data flows and policing data flows.

Forwarding in the IP/IP Case is handled as follows: Upon receiving a multicast datagram from the CMS-side interface, a BMR first decrements the TTL of the datagram, and discards the packet if the TTL is zero. Then it examines the destination multicast (CMS) address of the packet. From the information exchanged by BMRP, it determines the set of remote BMRs that should receive the packet. It then finds the UMS group with that subset of BMRs as members.

The packet is encapsulated in an outer IP packet by prefixing an IP header. The source address is the BMR's address on the UMS-side interface. The destination address is the UMS group chosen above. The TTL should be set to an administratively configured value sufficient to reach all peer BMRs. The TOS byte and DF bit are copied from the original IP header. The Next Protocol field should be set to "Internet Protocol". The newly constructed packet is then forwarded via the UMS-side interface.

Each BMR joins the appropriate groups on the UMS-side interface. Upon receipt of a packet on one of these groups on the UMS-side interface with Next Protocol field "IP", the BMR strips and discards the outer IP header. Then, it processes the inner IP datagram. First, it decrements the IP TTL and discard the packet if the TTL is zero. Then, it checks whether the CMS destination address is one for which there is a local member. If so, the packet is transmitted via the CMS-side interface. Otherwise, the packet is silently discarded. The access to the kernel routing table to support multicast is via a routing socket.

The case of forwarding for IP/ATM enables efficient use of point-to-multipoint ATM VCs, and is as follows: Upon receiving a multicast datagram from the CMS-side interface, a BMR first decrements the TTL of the datagram, and discards the packet if the TTL is zero. Then it examines the destination multicast (CMS) address of the packet. From the information exchanged by BMRP, it determines the set of remote BMRs that should receive the packet. It then finds the VC. The packet is then transmitted on that VC.

Upon receipt of a packet on one of VCs interface the qcbmr assembles and processes the IP datagram. First, it decrements the IP TTL and discard the packet if the TTL is zero. Then, it checks whether the CMS destination address is one for which there is a local member. If so, the packet is transmitted via the CMS-side interface. Otherwise, the packet is silently discarded.

Simulators (or agents) speak RSVP, and their requests are for Controlled Load Service. The service provided to within-reservation packets should be equivalent to that of an unloaded network. Controlled Load flowspec is essentially an (r, b) token-bucket specification. The RSVP PATH messages contain the sender's IP address. The qcbmrd interprets joining a group as an implicit request for a reservation for all of the data sent to the group. With ATM, all receivers should have the same QoS. Implicit reservations means that all receivers have the same QoS.

The qcbmr QoS Module is responsible for managing WAN resources to serve the needs of simulation LAN groups. The QoS module must, then, a) parcel out limited WAN resources, and b) prioritize signaling with the WAN, while maintaining an RSVP signaling relationship with the applications, in which the WAN constraints are hidden.

The QoS module runs continually, as a part of the qcbmrd. At a high level it cycles and processes input events. The input events include:

Case 1: add a qcbmr to a LAN group qcbmr list.
qcbmr_need_group(IPADDRESS qcbmr, IPADDRESS langroup)
{
Look up the destination LAN group in the LAN group table.
  If not found, add a new entry with Tspec "epsilon"*.
* epsilon is a special Tspec less than any reasonable Tspec, but greater than 0. It allows a forwarding table to be computed which serves the new qcbmr, but may be supplanted if a new Tspec is developed.
Add qcbmr to the qcbmr list for this LAN group.
}

Case 2: drop a qcbmr from a LAN group's qcbmr list.
qcbmr_noneed_group(IPADDRESS qcbmr, IPADDRESS langroup)
{
Look up the destination LAN group in the LAN group table.
Remove qcbmr from the qcbmr list.
If this was the last qcbmr in the list, and there are no senders to this group, delete LAN group entry.
}

Case 3: Path Processing
void process_LAN_path(PATH_MSG
{*path_msg)
Look up destination LAN group in LAN group table.
If LAN group not found, make a new LAN group block and install in LAN group table.
Look up path msg sender in LAN group entry sender list. If sender not found and path msg Tspec !=0, add a new sender entry to the LAN group.
If path msg Tspec !=sender entry Tspec, change sender entry Tspec.
If new tspec is 0 (i.e. this is path timeout), delete sender.
If no senders and no qcbmrs, delete entry.
Set the recompute_Tspec flag in entry.

}
  Case 4: WAN results
void process_WAN_result()
{
Match the result with the request.
If a new VC was opened, initialize an actual-VC entry. If a VC was closed, delete an actual-VC entry. If an open failed, add it to the Failed Holdoff table.
}

Changes in flow or routing state must be reflected in the forwarding table. Two update strategies are possible: 1) recompute forwarding for groups that change one-by-one as input events are processed; or 2) note which groups have changed, as they change, and do all the forwarding table computation at once just prior to the QoS cycle.

The Qos module also performs the following cycles, which break down into three pieces: propagate changed Tspec's, perform ATM signaling, and choose how to forward.

For both IP/IP and IP/ATM solutions, the following three-stage approach is used: First, compute aggregated reservations, in which the QoS information is collected from an agent of the simulators in the form of RSVP PATH messages, which are then aggregated for the WAN multicast groups. Second, make WAN reservations using methods consistent with the properties of the transport mechanism. In the IP/IP case, this depends on the use of RSVP signaling on the multicast groups, in the IP/ATM case the QoS parameters for the VC corresponding to the group are set. Finally, choose which UMS group to forward to.

The methods for WAN reservations for IP multicast groups and ATM point-to-multipoint VCs are fundamentally different. In each case, there is a resource limit in the form of the number of groups or VCs available. However, ATM signaling is slow and the number of outstanding requests small, which serializes the operations that open or modify circuit properties. Also, RSVP reservation changes can be signaled quickly, although we do not know how long it takes to take effect in the intermediate routers.

ATM signaling is either opening new VC's, or resizing existing VC's. Individual QoS cycles will alternate between these two options. Resizing can be done in two ways: expansion of a VC Tspec to guarantee delivery of more data, or reduction of a VC Tspec to return unneeded bandwidth to the network. The VC to be resized is chosen from the actual-VC table, by the criteria:

largest increase needed (desired Tspec–actual Tspec), or largest decrease allowed (actual Tspec–desired Tspec)

QoS cycles which resize VC's will alternate between enlarging and reducing VC's. A "resize" may be "close VC" if it is no longer needed.

There are two strategies for choosing VC's to open: one to use when below the VC limit for the network port, and one to use when at the limit.

Figure 6:
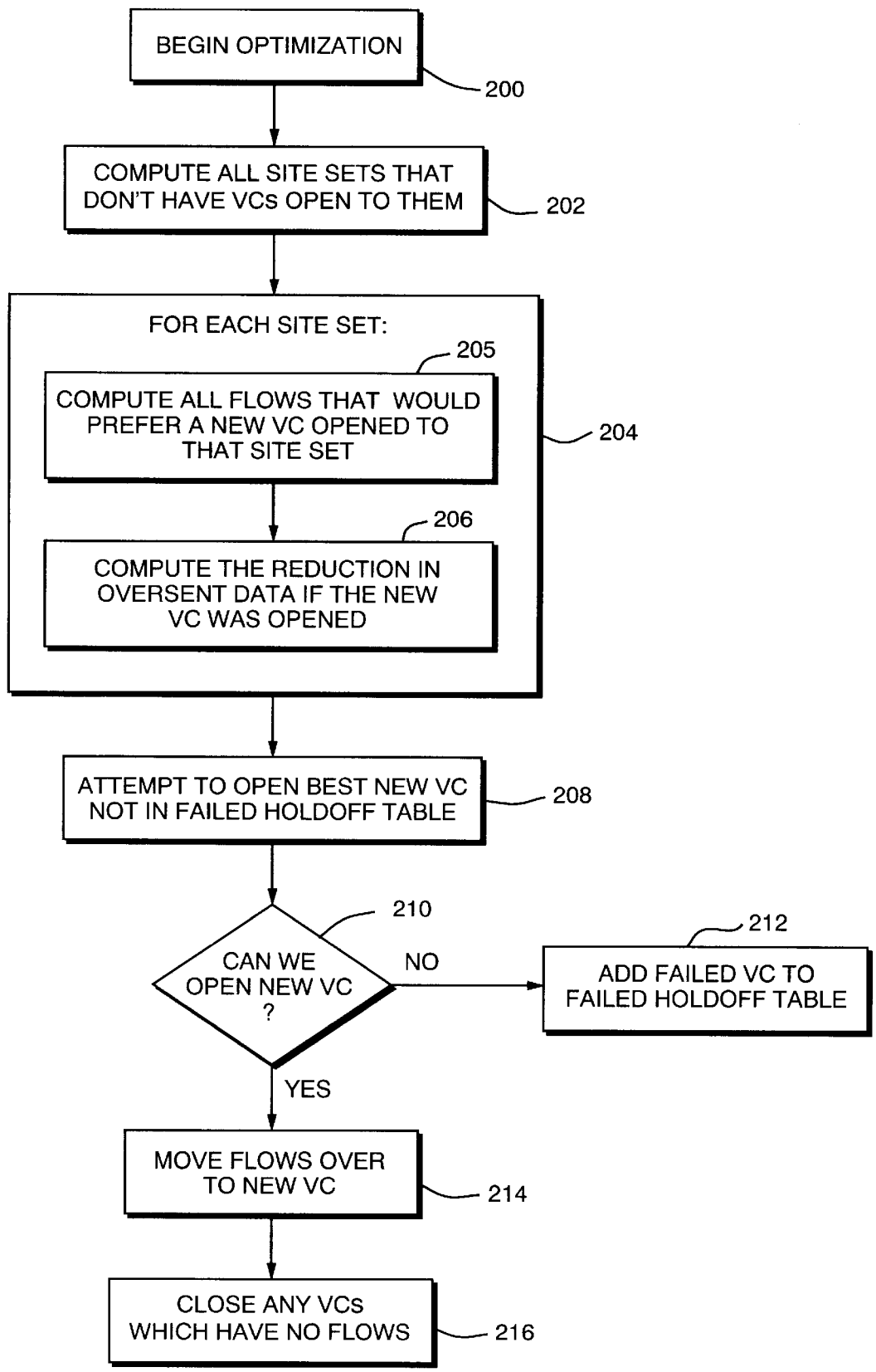
FIG. 6 is a flowchart of steps performed for optimizing traffic flow when a qcbmr is below the VC limit, according to one embodiment of the invention.

The steps performed for below the VC limit are outlined in FIG. 6. Optimization starts, step 200. As previously mentioned optimization can take several forms, which in the preferred embodiment includes alternating between resizing an existing VC, and attempting to open a new VC. Here, the optimization is attempting to open a new VC. The set of sites which do not have VCs open to them is computed, step 202. For example, consider sets of qcbmrs to which we would like to deliver a LAN group, which are currently delivered to a superset. For each set, compute all the flows that would prefer a new VC opened to that Set, step 205. Then compute the reduction in Oversent data if the new VC was opened, step 206.

Open a VC to this set, if the VC is not listed in the Failed Holdoff Table, step 208. If unable to open that VC step 210, the VC is added to the Failed Holdoff Table, step 212; and the optimization cycle is complete. Adding the VC which could not be opened to Failed Holdoff table prevents the (open new VC) optimization cycle from continually trying to open the same VC repeatedly. The Failed Holdoff Table is cleared periodically, for example, every thirty seconds. Alternatively, a heuristic may be used to monitor and clear the Failed Holdoff Table.

If the attempt to open the new VC was successful, then move the flows appropriate to that VC over to the new VC, step 214. If any presently open VCs are now empty, close them, step 216.

Figure 7:
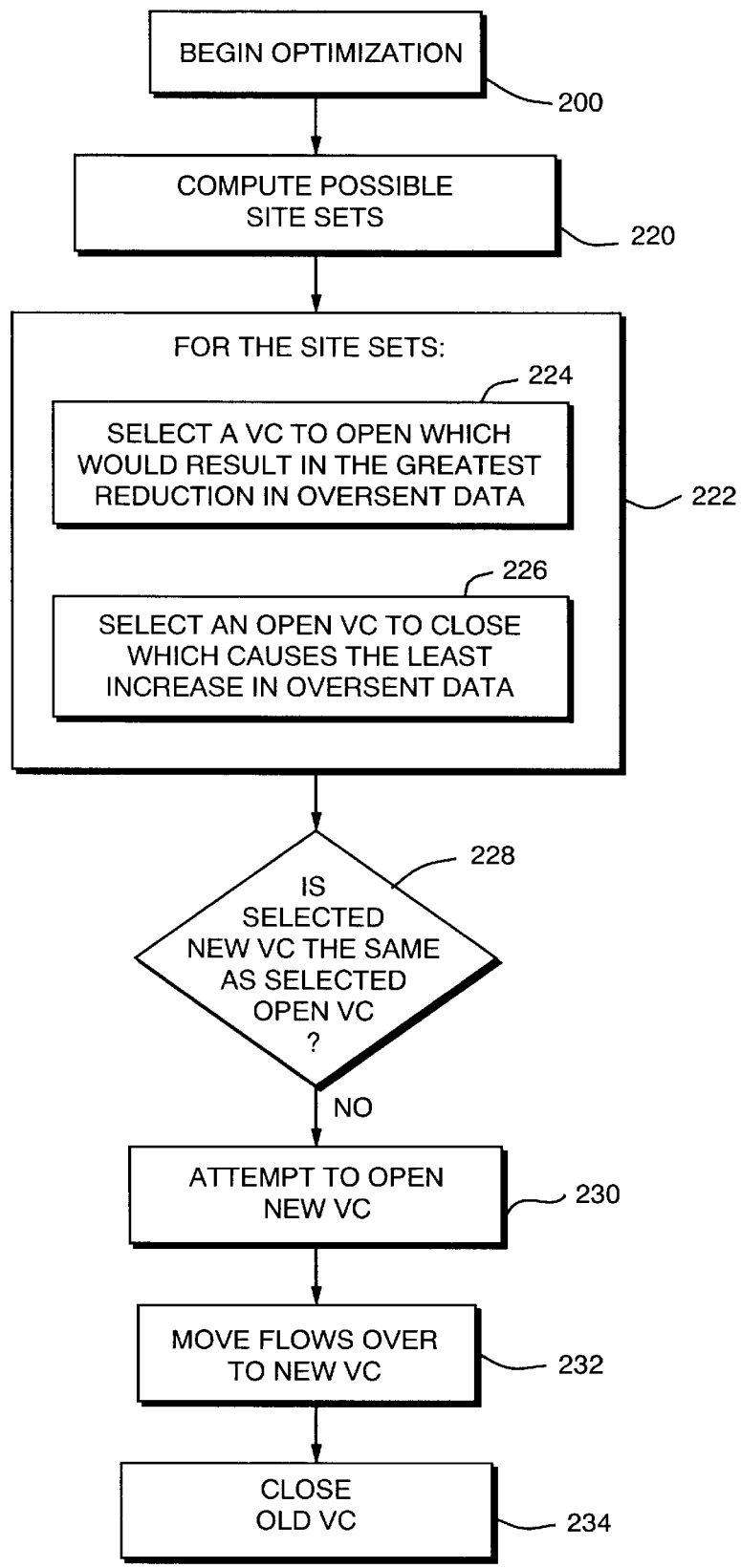
FIG. 7 is a flowchart of steps performed for optimizing traffic flow when a qcbmr is at the VC limit, according to one embodiment of the invention.

The steps performed when at the VC limit are outlined in FIG. 7. Optimization begins, step 200, which is the same as in FIG. 6. Possible Site Sets (VCs connecting subsets of all sites) are determined, step 220 FIG. 7. These site sets are considered, step 222. A VC is selected from the site sets that we wish to open, step 224. In the preferred embodiment, the VC is chosen which results in the greatest reduction in oversent data (data sent to more recipients than necessary).

Now, with consideration of the set of presently open VCs plus the selected new VC, an select an open VC to close, step 226. In the preferred embodiment, the open VC is selected which, when closed, causes the least increase in oversent data.

Although steps 222 and 224 are performed sequentially in the preferred embodiment, the steps can be performed separately, wherein the open VC is selected without consideration of the selected new VC to open.

At step 228, if the new selected VC turns out to be the same as the presently open VC, the optimization does not continue, since that would create a new VC with the same site set as the presently open VC.

If the VCs are different, attempt to open the new VC, step 230. This step is similar to step 208, 210 and 212 of FIG. 6., in that if the request to open the new VC is denied, the denied VC is placed on the Failed Holdoff Table. Further, in the preferred embodiment, if the new VC is already in the Failed Holdoff table, do not attempt to open the new VC.

If the new VC is opened, then move appropriate flows over to the new VC, step 232, and then close the old VC (the VC selected to be closed), step 234.

In the preferred embodiment, this functionality is performed by the functions computeVCToOpen, closeAVC, belowLimitReduceOversent, and atLimitReduceOversent.

The procedure computeVCToOpen is called by below-LimitReduceOvesent and atLimitReduceOversen. It chooses the "best" VC to open, in regards to reducing oversent traffic.

This procedure takes one input argument, checkOptHoldoff which is Boolean TRUE if optimization Holdoff should be observed. This procedure takes pointer arguments used for output: bestSiteList, the SiteList of VC to open; bestTSpec, the TSpec of VC to open; bestlgbList, the list of Lan groups to be forwarded on the VC; and bestPerSiteLimited, which is Boolean TRUE if new VC hits a per-site VC limit.

ComputeVCToOpen generates a list of Lan groups which are delivered to more places than necessary. This is done by cycling through the Lan group table, looking at the actual VC serving each group. If the SiteList of the VC is a proper superset of the Lan's desired sitelist, the group is considered oversent. If that group is not already in the oversent list, it is added.

ComputeVCToOpen considers sets of qcbmrS to which it could open a new VC, onto which it could move traffic which is oversent on existing VC's. The VC which results in the greatest reduction in oversent traffic is considered the "best". A Lan group's oversent traffic typically is measured as a TSpec, and is the product of the number of extra sites to which it is sent multiplied by the TSpec of that group.

ComputeVCToOpen( ) does not consider all 2^N possible VC's to N qcbmrS. It checks only VC's to SiteLists that 1 or more existing Lan groups already wish to be delivered. This cuts down the search space (the procedure only needs to look at entries in the Lan group table). It has the effect of rejecting any VC which would combine the traffic from two or more different Lan groups of which one groups SiteList is not a superset of the other(s). For example, group 1 going to A&B will never be merged with group 2 going to B&C on a VC going to ABC.

As computeVCToOpen( ) goes through the Lan group table, looking for SiteLists to which it could open a VC, it will skip a candidate SiteList if The Lan group of that SiteList is on a VC that is signaling.

The candidate SiteList has failed signaling recently.

The optimization holdoff is selected and the candidate

SiteList has failed optimization recently.

Note that if opening a VC to the sitelist being considered would cause a per-site VC limit to be exceeded, the optimization holdoff will be checked for that sitelist even if the caller did not ask for it.

The procedure closeAVC( ) picks a VC to close given a VC to be opened. It is called when VC resource limit is reached, a new VC can not be opened without closing an old one (as outlined in FIG. 7).

The procedure closeAVC takes the following input arguments: subset, the set of sites which VC to be closed must service; newSiteList, the Sitelist of VC to be opened; reducedTSpec, the amount of reduction gained by opening new VC; vcToOpen, VC Block of new VC; newTSpec, the TSpec of new VC; and newlgbList, the LAN group block list of new VC.

CloseAVC( ) determines the best VC to close, given that the specified VC will be opened. The "best" VC is the one whose closure would result in the lowest increase in oversent traffic. If closing the "best" VC would result in a greater increase in oversend than the new VC would eliminate, no VC is closed (optimization has failed).

Choosing the VC to close is done as follows:
Insert the VC to be opened into the actualVCTable.
Initialize per-VC "increased oversent" bins to 0 TSpec.
Cycle through all the LAN blocks. For each LAN:
{
Remove LAN's VC from actualVCTable.
Find a new VC for LAN.
Compute the change oversend: oversend.newVC-oversend.oldVC of this LAN (may be negative).
Add this change to that VC's increased-oversent bin.
Put LAN's VC back into actualVCTable.
}
Select VC with smallest change in oversent (may be negative) as the one to close.

The procedure belowLimitReduceOversent reduces over-sent traffic by opening a new VC. This procedure starts by calling computeVCToOpen. ComputeVCToOpen may return a VC sitelist of an existing VC, but with a larger TSpec. If it does, the Lan groups specified in the return argument are moved onto the existing VC. A later "improveGuarantees" phase will open a larger capacity VC to that sitelist.

If a VC to the "best" sitelist does not exist, it is opened. The new VC may exceed the outgoing VC limit for one or more sites. If so, closeAVC is called to close a VC that goes to those sites.

If no limit is exceeded, the procedure simply opens a new VC to the "best" sitelist returned by computeVCToOpen.

The procedure atLimitReduceOversent reduces oversent traffic by opening a new VC and closing an old one. The procedure calls computeVCToOpen( ). If the indicated VC is already open, the Lan groups identified are shuffled onto that VC, as in "belowLimit". CloseAVC is then called.

Another feature of the present invention includes policing for Quality of Service for aggregated flows. The reservation system in RSVP does not specify a particular mechanism for characterizing or aggregating flows, but uses the generic concept of a flowspec. The qcbmr system uses a Controlled Load model for the traffic, and characterizes the flowspec through Token Bucket parameters. In the simplest version of this model, one imagines a flow of tokens into a bucket. When a packet arrives for processing, the system compares the packet size (l) with the number of tokens (n) in the bucket. If l<=n, the packet is said to conform with the condition set by the flowspec, and therefore decrement the number of tokens by 1, and let the packet pass. If l>n, the packet is said to be non-conforming, it is discarded. This process is called traffic policing. In the qcbmr a novel version of policing is used.

In token bucket model, for any flow f(t) over some period 0<t<T and any bucket refill rate r, there is a bucket size b that will accommodate the flow. The pair (r,b) is the flowspec in this model. If the reserved rate is small relative to the actual rate for an extended period, the required bucket size b becomes large. The challenge is to pick (r, b) that accommodates the flow but consumes as little of the system's resources as possible.

Figure 8:
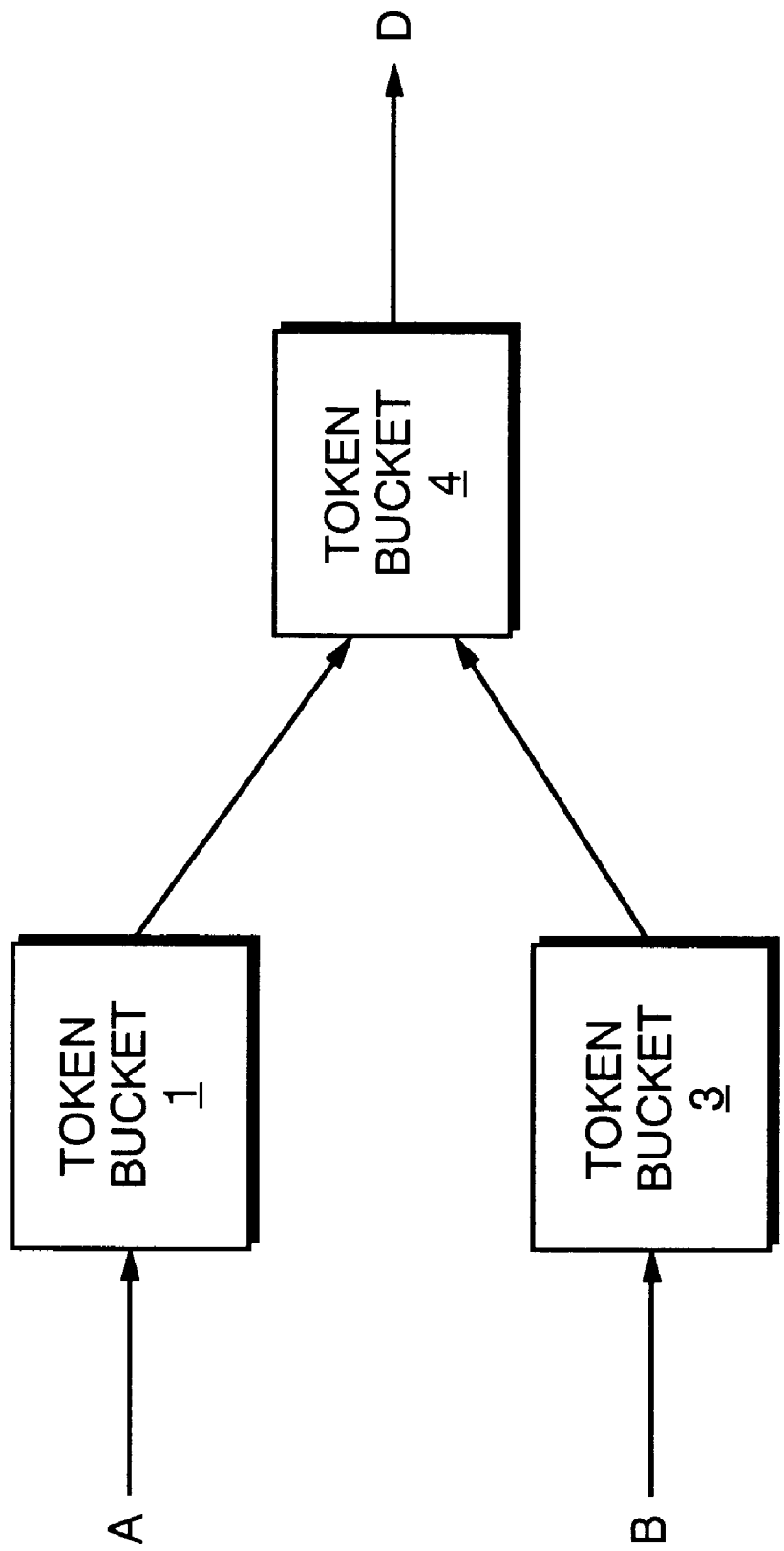
FIG. 8 block diagram showing how token buckets feed forward for several flows into a node.

To choose optimally among multiple valid (r, b), consider network admission control algorithms. FIG. 8 illustrates a scenario where packets that arrive on a particular physical or virtual interface for a group, A must be replicated and forwarded out physical or virtual interface D. Packets arriving for a different combination of physical or virtual interface and group, B in the figure, also need to be forwarded out of interface D. Note that A and B could alternately represent a single group that has two distinct sources.

Potential policing points are available at the token buckets. Policing can take place at flows through the router. Token buckets 1 and 3 are associated with the arrival of a flow from an interface (IN), before the point where packets are replicated/switched, and bucket 4 is associated with flows being sent out an interface (OUT) (or VC in the case of ATM). Bucket 3 is referenced by the "destination" portion of the first route in the example, bucket 4 is referenced by the "gateway" portion of the first and third routes, and bucket 1 is logically referenced by the "destination" portion of the last two routes.

The qcbmr according to one embodiment of the present invention makes a decision to send or drop each packet, and does not perform packet scheduling. Each packet being policed has policing state information associated with it.

In the simplest case, called strict policing, the token bucket process compares the number of byte tokens, n in the bucket at any time with the length, l, of the packet being processed. If n>l, then the packet is, the number of tokens is decremented by 1, and the packet is passed to the next stage. Otherwise the token bucket is not modified and the packet is discarded.

Figure 9:
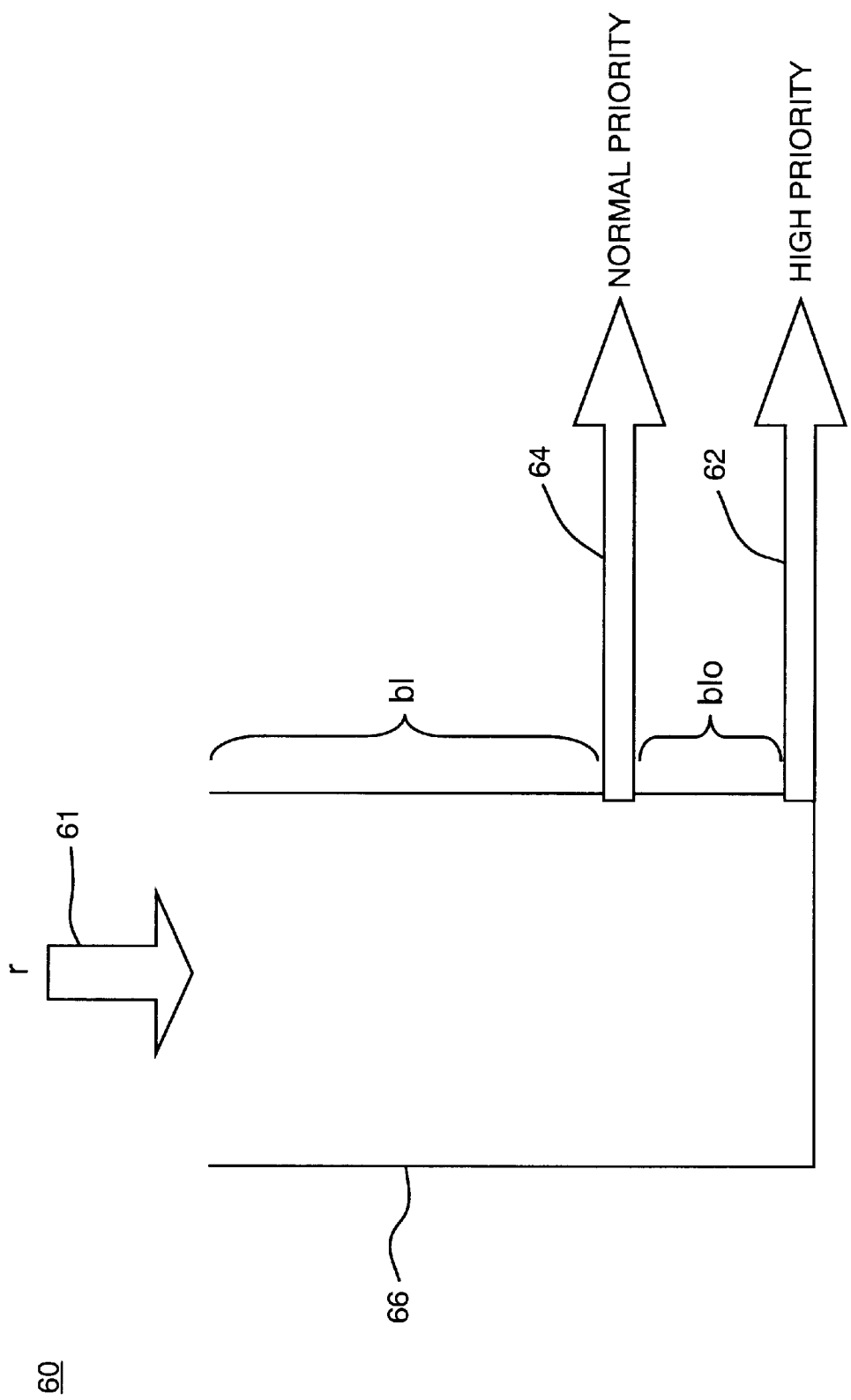
FIG. 9 is an overview of priority policing according to another embodiment of the present invention.

The token bucket structure is expanded according to one embodiment of the present invention to support two levels of policing, as shown in FIG. 9. The token bucket 60 is refilled at a rate r (61). Messages and packets which arrive at the node associated with token bucket 60 use different outlets to measure whether the packets conform. High priority packets that conform to all previous flowspecs use the entire bucket 60 by "using" high priority outlet 62. Low priority packets use only the contents bl of the token bucket as shown by outlet 64. Normal or Low priority packets that conform to all previous flowspecs use the upper portion of the bucket only, through outlet 64. This leaves blo tokens available for a burst of high-priority packets.

If the token bucket 60 does not contain enough tokens for the packet (depending on the outlet 62, 64), the packet is marked as non-conforming. The non-conforming packet may be dropped, or be further processed as described below.

Figure 10:
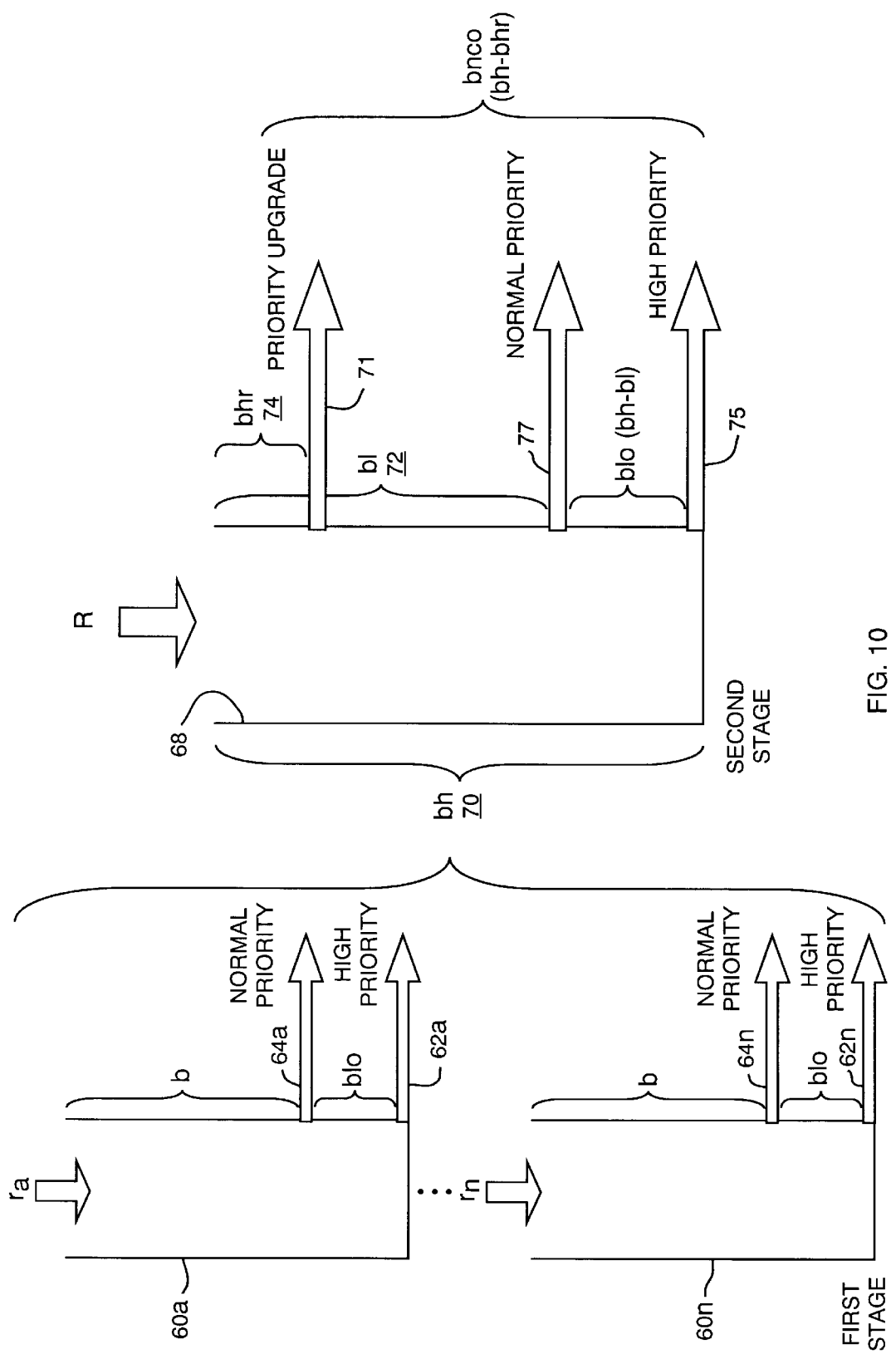
FIG. 10 is an overview of two-stage policing according to another embodiment of the present invention.

Packets that arrive at this policing point marked as non-conforming, may be upgraded to conforming using a priority upgrade outlets 74 as shown in and described with conjunction to FIG. 10. The priority upgrade outlet 74 uses only a small amount of headroom at the top of the token bucket.

In another embodiment of the present invention, known as two-stage policing, packets are compared to the tokens in a first token bucket 60a–n FIG. 10, which is on a per-flow basis. High priority packets use the entire contents of the token bucket, as shown by the high priority outlet 62. Low priority packets use only the contents of the token bucket as shown by outlet 64.

If there are not enough tokens (as drawn from the outlet 62 or 64, depending on packet priority), the packet is marked non-conforming. As described below, non-conforming packets may be dropped, or passed on, or possibly marked conforming.

A second token bucket 68 is used for the combined (aggregated) flows which then pass through the node. This second token bucket 68 is similar to first stage token buckets, but also includes a priority upgrade outlet 71, for use in certain policing modes.

Packets which were conforming in the first stage token buckets 60 are again tested using second stage token bucket 68. Similarly, high priority packets "use" high priority outlet 75, and low priority packets use low or normal priority outlet 77. In either case, if there are not enough tokens as required in token bucket 68 for the packet, the packet is marked non-conforming.

The priority upgrade outlet 71 allows for situations where, if a node has extra unused capacity 74 (in the form of extra tokens above the priority upgrade outlet 71), packets which come in non-conforming may be upgraded to conforming. This is a great benefit in certain situations, for example where low-priority traffic in one Lan group flow is protected from high-priority traffic in a misbehaving (not conforming to specified flow spec) flow when both flows are forwarded through the same wangroup/VC. Although the priority upgrade outlet 71 is described in terms of two-stage policing, it is equally applicable to single stage (as shown in FIG. 9).

In the preferred embodiment, the token bucket parameters, specified in a struct tb_params, are as follows.
mtu Maximum packet size to be passed.
m Minimum policed unit.
r Number of bytes per second to be added to the bucket.
bh Number of bytes for high priority packets (70, FIG. 10).
bl Number of bytes for low priority packets (77, FIG. 10).
bhr Number of bytes for non-conforming packets (74, FIG. 10).
mode Policing mode, a Pol_xxx value.

The mtu parameter is the maximum size (IP length), in bytes, allowed for a packet to be conforming.

The m parameter is the minimum policed unit. Packets whose size, in bytes, is less than this value are treated as having a size m.

The r parameter, in bytes per second, is the rate at which tokens are added to the token bucket. It is the sustained flow rate.

The bh parameter, in bytes, is the token bucket size for "high priority" packets (IP precedence greater than 0). If the bucket contains fewer tokens than the packet size, the packet is non-conforming.

The bl parameter, in bytes, is the token bucket size for "low priority" packets (IP precedence of 0). If the bucket contains fewer tokens than the packet size plus (bh–bl), the packet is non-conforming. The bl parameter must be no larger than the bh parameter.

The bhr parameter, in bytes, is the token bucket size for "non-conforming" packets. If the bucket contains fewer tokens than the packet size plus (bh–bhr), the packet is non-conforming. The bhr parameter must be no larger than the bl parameter. Note that this parameter is only used for the Pol_Hdrm_Strict or Pol_Hdrm_Tag modes (see below).

Possible parameter values for the bucket contents are bhr=10000 bl=20000 bh=30000.

The mode parameter indicates how the policing is performed. The basic policies are:
allow a packet and mark it conforming,
allow a packet and mark it non-conforming (tagging), or
drop a non-conforming packet.

A packet becomes non-conforming when its size exceeds the mtu parameter, or the token bucket has insufficient tokens. There are three cases, depending on the packet priority and non-conforming status.
Already non-conforming #tokens<size+(bh—bhr), or
Low priority #tokens<size+(bh—bl), or
High priority #tokens<size The policing modes supported are defined by the police_ modes enumeration.
Pol_None No policing.
Pol_Strict Drop non-conforming packets, based on priority.
Pol_Tag Tag non-conforming packets, based on priority.
Pol_Hdrm_Strict First considering headroom, drop non-conforming.
Pol_Hdrm_Tag First considering headroom, tag non-conforming.

Pol_None mode indicates that no policing or token bucket updates should be performed. All packets are considered to be conforming.

Pol_Strict mode indicates that non-conforming packets should be dropped.

Pol_Tag mode indicates that non-conforming packets should be tagged so that subsequent processing steps, e.g., another token bucket or a network driver that implements tagging, can process the non-conforming packets accordingly.

Pol_Hdrm_Strict mode indicates that non-conforming packets for which there are sufficient tokens in the token bucket (based on the bhr parameter) should be considered to be conforming. If there are insufficient tokens, the packet should be dropped.

Pol_Hdrm_Tag mode indicates that non-conforming packets for which there are sufficient tokens in the token bucket 68 (based on the bhr parameter) should be considered to be conforming (they use outlet 71). If there are insufficient tokens, the packet should be "tagged" by the network driver, if the driver supports tagging.

Each token bucket contains the following information.

| Dynamic parameters | |
| --- | --- |
| b | Number of tokens (bytes) in the bucket. |
| c | Counter at last update (platform dependent). |
| t | Time of Day at last update. May only be accurate to a few tens of milliseconds. Indicates when bucket was last used, and available to management. |
| Statistics | |
| pkts bytes | Packets & bytes examined. |
| tag_pkts tag_bytes | Packets & bytes tagged. |
| drp_pkts drp_bytes | Packets & bytes dropped. |
| tb_accid | When non-zero, the token bucket ID of a bucket whose statistics are updated like those above. |

-continued

Control/management

| | |
|---|---|
| ref_cnt | Number of references to this bucket. |
| k0 | Number of seconds that will fill the bucket. |
| flags | Control flags:<br>TB_PURGE Token bucket should be freed when ref_cnt becomes zero.<br>TB_ACTIVE Token bucket is in use.<br>TB_IN Incoming, e.g., a destination, bucket.<br>TB_OUT Outgoing, e.g., a gateway, bucket.<br>TB_LCPB r is right shifts for cycles/byte approximation.<br>TB_BPC r is bytes/cycle, not cycles/byte. |

Static configuration

| | |
|---|---|
| r | Converted refill rate, see TB_BPC & TB_LCPB. |
| bnco | Non-conforming bytes, bh - bhr. |
| blo | Low priority bytes, bh - bl. |
| bh | High priority bytes, depth of bucket. |
| m | Minimum policed unit. |
| mtu | Maximum packet size. |
| mode | Policing mode, see enum police_modes. |

Identification

| | |
|---|---|
| id | Bucket id information, for SNMP, e.g., a sockaddr with group and interface address. |

All token bucket structures are located in a contiguous memory region and referenced by a <pointer, identifier>tuple. The static pointer permits the contiguous region to be expanded as the number of token buckets grows. The identifier is held, e.g., in the routing table entries that use a particular bucket. Being in a contiguous region of memory makes it possible to quickly obtain a consistent snapshot of the statistics information for all token buckets. In addition, some token buckets may be used as ""accumulators" of the packet and byte counts of other token buckets. The token bucket identifier of the accumulator, if any, is held in the tb_accid entry of those token buckets to be summed.

The first entry in the region is used for overhead information. The t variable contains the time that a snapshot was taken. The b variable contains the number of token buckets allocated in the region. The r variable contains the index of a free bucket. The r variables in free entries contains the index of the next free entry. A value of zero is used to terminate the free list.

Each packet being policed has policing state information associated with it. The information is stored in the m_pkthdr part of the mbuf chain holding the packet.
priority Priority of packet, 0 is low.
nonconform The packet is non-conforming.

The policing function, tb_filter( ), has three parameters: the token bucket identifier, a pointer to the packet, and the length of the packet. It either updates the packet state information and returns zero or it returns ENOBUFS when the packet should be dropped.

For Pentium based qcbmrs, the built in 64-bit cycle counter is used to measure elasped time. The r parameter will be converted to units based on the pre-configured rate of the counter. The cycle_counter( ) routine can be used to read the counter.

An application with root privileges manages token buckets using a set of IOCTLs. IOCTLs allow an operation and its outcome to be easily associated without having to search through a set of messages looking for the response, as is the case for use of, e.g., a routing socket.

An application with root privileges may associate token buckets with routing table entries that are being created. A PF_ROUTE socket of type SOCK_RAW is used to specify routes. A route is added or deleted by sending a message of type RTM_ADD or RTM_DELETE (or RTM_MADD or RTM_MDELETE in the case of multicast routes) to a routing socket. The message begins with a struct rt_msghdr header and is followed by zero or more sockaddrs, as specified by the rtm_addrs bit mask field in the message header. The rtm_addrs bit mask has been extended to include bits for token buckets. A list token bucket identifiers, each sizeof (u_int32_t) bytes long, follows the sockaddrs.

The RTA_TBDST bit in rtm_addrs indicates that a token bucket identifier is present. That token bucket is used for all packets that match the destination specified in the route. In the RITN context, this token bucket would be used to police "Lan" traffic.

Figure 11:
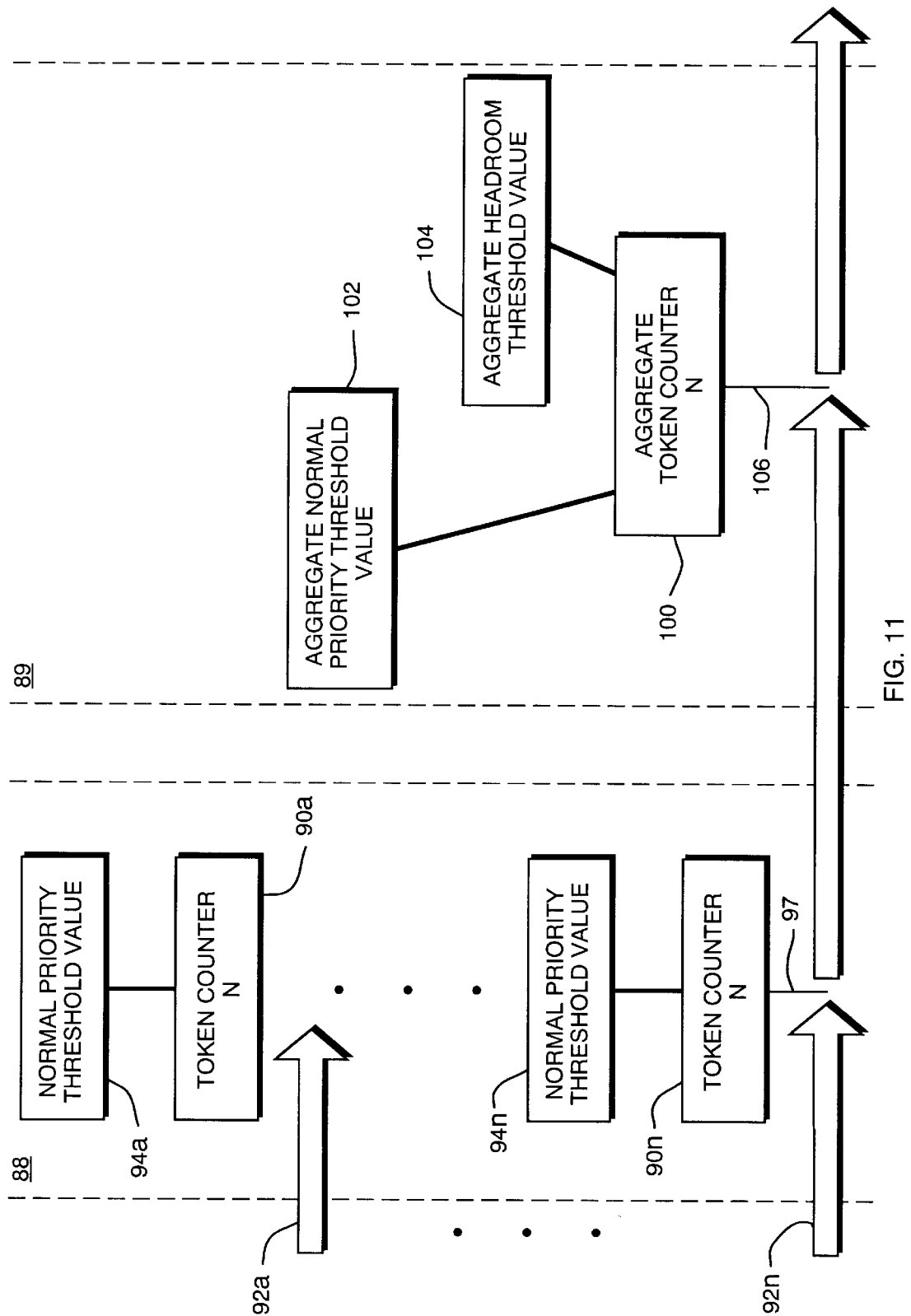
FIG. 11 is a block diagram providing more details of two-stage policing as shown in FIG. 10.

As another example of two-stage policing according to one embodiment of the present invention, flows 92a–n FIG. 11 arrive at the first stage policing 88. A token counter 90 maintains a count of the number of tokens presently contained in the "token bucket". The token counter 90 is updated by token rate r, as previously discussed. The token counter 90 also has an upper (maximum), which if reached, will not go above that limit. Associated with token counter 90 is a normal priority threshold value 94. This corresponds to blo (bh–bl) level as shown in FIG. 9. High priority packets arriving on flow 92 are compared (based on the number of tokens required to pass that packet) to the direct value of token counter 90. Low priority packets are similarly compared to the value of token counter 90 minus the normal priority threshold value 94.

When either type of packet is below the compared value (—i.e., there are not enough tokens to send it), it is marked as non-conforming, at location 97. Depending on the policing mode, non-conforming packets may be dropped at this point.

Second stage policing is shown at 89. Aggregate token counter 100 is updated by token rate R. R can for example be the sum of the r rates for first stage token buckets 90. Aggregate token counter 100 has associated with it an aggregate normal priority threshold value 102, which is similar to normal priority threshold values 94 in first stage policing 88. Packets which were conforming for the first stage policing are again compared (by token requirements) to the value in aggregate token counter 100. High priority packets compare against the direct value 100, and low priority packets compare to the direct value 100 minus the aggregate normal priority threshold value 102. Depending on the policing mode, packets which fail are marked as non-conforming, or dropped.

Also associated with aggregate token counter 100 is aggregate headroom threshold value 104, which compares to bnco (bh–bhr) as shown in FIG. 9. According to one embodiment of the invention, a packet that was marked non-conforming in first stage policing 88 (FIG. 10) may be marked as conforming by comparing the number of tokens the packet requires to aggregate token counter 100 minus aggregate headroom threshold value 104. If the there are enough tokens, then the packet may be marked conforming (upgraded from CLP 1 to CLP 0).

The IP and ATM wan environments are somewhat similar, but differ fundamentally in that there is a useful priority bit (CLP) in the ATM case. The ATM switches are expected to forward all conforming cells of compliant VCs. They are also expected to drop all nonconforming cells, and are not be expected to do anything at all useful with noncompliant VCs. VBR-tagged is used, or VBR-non-tagged (for strict policing.

IP routers will likely not respect the TOS byte (at the present time, this could change). For IP/strict mode, this is unnecessary. However the present invention could support routine and elevated status for IP/priority mode.

Essentially, two output modes are provided. One is that packets which fail policing will be dropped. The other is that they will be sent in a low-priority mode. For ATM, this is CLP=1. For IP, this would be TOS routine.

Thus, the output CLP does not reflect whether a packet is high or low priority, but whether it has passed policing and should be protected. This allows low-priority traffic in one LAN group flow to be protected from high-priority traffic in a misbehaving flow when both are forwarded via the same VC.

As various changes could be made in the above constructions without departing from the scope of the invention, it should be understood that all matter contained in the above description or shown in the accompanying drawings shall be interpreted as illustrative and not in a limiting sense.

APPENDIX A

Glossary

ATM: Asynchronous Transfer Mode, a cell-based high speed networking protocol.
BMR: A bilevel multicast router is a device which provides a constructed multicast service (CMS) from an underlying multicast service (UMS).
BMRP: A bilevel multicast routing protocol) is a particular protocol in use between one implementation of bilevel multicast routers.
CBR: Continuous (or Constant) Bit Rate, a characterization of a VC indicating that the flow is relatively constant over time.
CLP: Cell Loss Priority, a one-bit flag in the ATM cell header. Cells that have the CLP=1 can be discarded in favor cells that have CLP=0.
Compliant: A sequence of packets is compliant if most of them are conforming.
Conforming: A packet is conforming if it meets the token bucket QoS specification. A packet with size >MTU is nonconforming.
CMS: The constructed multicast service is the multicast service provided by a bilevel multicast implementation.
Distributed Interactive Simulation: Distributed Interactive Simulation (DIS) is a system for simulating physical objects (entities) that move about in virtual space. The DNEM project is designed to support DIS.
GRCA: Generic Cell Rate Algorithm
IGMP: Internet Group Membership Protocol.
IP/ATM: The case where the LAN multicast packet is transported from one site to another using an ATM point-to-multipoint SVC.
IP/IP: The case where the LAN multicast packet is encapsulated in a WAN packet using a limited number of WAN multicast groups for efficient transport of the traffic over the WAN connection.
LT2N: A strategy for establishing multicast connections (paths?) that requires, for n sites, fewer than 2^n paths/connections.
Minimum Policed Unit: In a controlled load flowspec, packets that are smaller than the minimum policed unit are treated as if they were precisely the size of the minimum policed unit. Essentially, before the computation is done, one adjusts the length (or the number of tokens required to satisfy the requirement) using the rule:

if (1<m) then 1=m;

For example, if m is 50 bytes, a 30 byte packet is counted as 50 bytes.
MBS: Maximum Burst Size, in cells, used by ATM QoS specifications.
MTU: Maximum Transmission Unit, the size in bytes of the largest packet that can be accepted by the network without fragmentation.
NNI: Network-Network Interface, which specifies the protocols that are used between two switches in the interior of the network.
PVC: Permanent Virtual Circuit, a virtual circuit set up when the switch starts, defined in the configuration files of the switch.
QoS: Quality of Service
qcbmr: QoS-Capable bilevel Multicast Router
SCR: Sustainable Cell Rate
SVC: Switched Virtual Circuit, a virtual circuit set up on demand. The qcbmr uses point-to-multipoint ATM circuits to transport packets from one site to another.
UMS: The underlying multicast service is the multicast service used by a bilevel multicast implementation.
UNI: User-Network Interface, which specifies the protocols that are used between a device at the edge of the network (an end system or user system}) and the network.
VBR: Variable Bit Rate, a characterization of a VC indicating that the flow is bursty.
VC: Virtual Circuit, a logical connection between two points in the network, generally an entrance and exit point, that has state defining the passage of data from one end to the other.
WAN: Wide Area Network
Weakly Conforming: A cell is weakly conforming if it meets the CLP=0+1 QoS spec but not the CLP=0, that is if the network is allowed to discard the cell to avoid congestion. This essentially means that it meets the PCR spec but not SCR/BT.

What is claimed is:

1. In a network system including a plurality of endpoint sites, said network system including a plurality of open point-to-multipoint virtual circuits (VC)s between various endpoint sites, a method of optimizing traffic flow, comprising:

determining a set of possible point-to multipoint VCs to said endpoint sites, said set excluding combinations with VC connections already open;

for each possible VC in said set, estimating a reduction in oversent data that would occur if said possible VC was opened;

opening a new VC corresponding to said possible VC with a greatest reduction in oversent data;

moving appropriate traffic over to the newly opened VC; and closing any open VCs which no longer have any traffic.

2. The method of claim 1 wherein said step of opening said possible VC further includes:

if said possible VC can not be opened, an identification of said possible VC is placed on a list of VCs which could not be opened.

3. The method of claim 2 wherein said step of determining the set of possible VCs to said endpoint sites further includes excluding VCs identified by said list of VCs which could not be opened.

4. The method of claim 2 wherein said list of VCs which could not be opened is periodically cleared of all entries.

5. The method of claim 1 wherein said method of optimizing traffic flow further includes:

resizing the Qos (quality of service) of an existing open VC.

6. The method of claim 1 wherein if an open VC limit is reached, the steps of:

determining a set of possible VCs to said endpoint sites;

from said set of possible VCs to said endpoint sites, selecting a new VC to open which, if opened, would cause the greatest reduction in oversent data;

from said plurality of open point-to-multipoint VCs, selecting an open VC which, if closed, would cause the least increase in oversent data;

if said new VC is different from said open VC, then opening said new VC;

moving appropriate traffic to said new VC; and closing said open VC.

7. In a network system including a plurality of endpoint sites, said network system including a plurality of open point-to-multipoint virtual circuits (VC)s between various endpoint sites, a method of optimizing traffic flow, comprising:

determining whether a number of open VCs is at a VC limit;

determining a set of possible VCs to said endpoint sites when the number is at the VC limit;

estimating, for each of the possible VCs, a reduction of oversent data;

from said set of possible VCs to said endpoint sites, selecting a new VC to open based on the estimating;

from said plurality of open point-to-multipoint VCs, selecting an open VC to close;

if said new VC is different from said open VC, then opening said new VC;

moving appropriate traffic to said new VC; and closing said open VC.

8. The method of claim 7 wherein if said step of selecting the new VC to open from said set of possible VCs to said endpoint sites further includes:

selecting a new VC to open which would cause the greatest reduction in oversent data.

9. The method of claim 8 wherein if said step of selecting an open VC from said plurality of open point-to-multipoint VCs further includes:

selecting an open VC which, if closed, would cause a least increase in oversent data.

10. The method of claim 9 wherein if said step of selecting an open VC which, if closed, would cause the least increase in oversent data includes accounting for said new VC having been opened.

11. The method of claim 7 wherein said step of opening said new VC further includes:

if said new VC can not be opened, an identification of said new VC is placed on a list of VCs which could not be opened.

12. The method of claim 11 wherein said step of determining a set of possible VCs to said endpoint sites further includes excluding VCs identified by said list of VCs which could not be opened.

13. The method of claim 11 wherein said list of VCs which could not be opened is periodically cleared of all entries.

14. A system for controlling traffic flow in a network system, said network system including a plurality of endpoint sites, and including a plurality of open point-to-multipoint virtual circuits (VC)s between various endpoint sites, said system comprising:

an open VC table to hold entries indicating said open VCs, each entry also including an indication of oversent data on each of said open VCs;

a possible VC table to hold entries indicating a set of possible VCs to said endpoint sites;

a network traffic estimator to scan said open VC table and said possible VC table, and to determine, for each entry in said possible VC table, a reduction in oversent data which would occur if a new VC was opened corresponding to that entry;

a VC instantiating component, to open a new VC corresponding to an entry in said possible VC table with a greatest reduction in oversent data; and a network traffic controller, to move appropriate network traffic to said newly opened VC.

15. The system of claim 14 wherein said network traffic estimator determines said reduction in oversent data which would occur if a new VC was opened corresponding to that entry, by determining what network traffic would be appropriate to send on said new VC.

16. The system of claim 14 wherein said network traffic estimator scans said open VC table to select one of said open VCs to close, and determines a reduction in oversent data for each entry in said possible VC table while presuming said selected open VC is closed.

17. The system of claim 16 further including a VC closing component, to close said selected one of said open VC's to close.

18. The system of claim 14 wherein said VC instantiating component includes a failed VC table, to place indications of failed VCs that said VC instantiating component is not able to open.

19. The system of claim 18 wherein said possible VC table excludes entries which correspond to indications of failed VCs in said failed VC table.

20. The system of claim 18 wherein said failed VC table is periodically cleared of said indications of failed VCs.

* * * * *